US005931625A

United States Patent [19]

Tax et al.

[11] Patent Number: 5,931,625

[45] Date of Patent: Aug. 3, 1999

[54] FREIGHT LOADING/UNLOADING CRANE

[75] Inventors: Hans Tax; Dieter Bauer, both of Munich; Klaus Hosler, Eichenau, all of Germany

[73] Assignee: Tax Ingeniewigesellschaft M.B.H., Munich, Germany

[21] Appl. No.: 08/522,402

[22] PCT Filed: Mar. 7, 1994

[86] PCT No.: PCT/EP94/00677

§ 371 Date: Nov. 13, 1995

§ 102(e) Date: Nov. 13, 1995

[87] PCT Pub. No.: WO94/20404

PCT Pub. Date: Sep. 15, 1994

[30] Foreign Application Priority Data

Mar. 8, 1993 [DE] Germany .............................. 43 07 254

[51] Int. Cl.[6] ...................................................... B65G 67/60

[52] U.S. Cl. ..................................... 414/140.3; 414/139.9; 414/141.3; 414/141.7; 414/786; 212/316

[58] Field of Search .............................. 414/139.4, 319.9, 414/140.3, 141.3, 141.4, 141.7, 786; 212/325, 326, 316

[56] References Cited

U.S. PATENT DOCUMENTS

| | | | |
|---|---|---|---|
| 3,812,987 | 5/1974 | Watanani . | |
| 4,106,639 | 8/1978 | Montgomery et al. | 414/141.7 |
| 4,546,852 | 10/1985 | Martin et al. . | |
| 4,877,365 | 10/1989 | Lanigan, Jr. et al. | 212/326 |
| 4,897,012 | 1/1990 | Brewer | 414/139.4 |
| 4,990,046 | 2/1991 | Tax et al. | 212/325 |
| 5,039,275 | 8/1991 | Ide | 414/141.3 |
| 5,048,703 | 9/1991 | Tax et al. . | |
| 5,152,408 | 10/1992 | Tax et al. . | |
| 5,505,585 | 4/1996 | Hubbard | 414/139.4 |
| 5,515,982 | 5/1996 | Hasegawa et al. | 414/140.3 |

FOREIGN PATENT DOCUMENTS

| | | |
|---|---|---|
| 0303884 | 2/1989 | European Pat. Off. . |
| 0342655 | 11/1989 | European Pat. Off. . |
| 0471411 | 2/1992 | European Pat. Off. . |
| 2283852 | 4/1976 | France . |
| 3837726 | 5/1990 | Germany . |
| 1317995 | 12/1989 | Japan . |
| 1557640 | 12/1979 | United Kingdom . |

*Primary Examiner*—Karen B. Merritt
*Assistant Examiner*—Douglas Hess
*Attorney, Agent, or Firm*—Baker & Botts, L.L.P.

[57] ABSTRACT

A freight loading/unloading crane (10) comprises a crane bridge (16) with two lifting units (26, 28) displaceable in their longitudinal direction with a lifting system (26*b*, 28*b*) and associated load receiving device (26*c*, 28*c*) and a transfer unit (32) with at least one load receiving region (32*o*, 32*u*). To prepare for a load exchange with one of the lifting units (26, 28), the transfer unit (32) is stopped adjacent to the lifting unit in question, so that this can continue to raise or lower its lifting system (26*b* or 28*b*) independently of the position of the transfer unit (32). The actual load exchange takes place by means of an operating device (36*o*, 36*u*), without further movement of the transfer unit (32).

19 Claims, 26 Drawing Sheets

FREIGHT LOADING/UNLOADING CRANE

BACKGROUND OF THE INVENTION

The invention relates to a freight loading/unloading crane, in particular a container loading/unloading crane, comprising a crane bridge with two longitudinal ends arranged at a distance from each other in a transfer direction, where at least one lifting unit movable on the crane bridge in the transfer direction is associated with each of the longitudinal ends, said lifting unit containing at least one lifting system with associated load receiving means and a transfer unit containing a load receiving region with a load receiving area, where the transfer unit and the lifting units are designed such that loads can be exchanged between each of the lifting units and the transfer unit.

A freight loading/unloading crane of this type is known, for example, from German Patent No. 1,906,212. The known crane is used for the loading and unloading of container ships. For the unloading of a container ship, a first lifting unit, the so-called water or ship trolley, lifts a container from the cargo compartment of the ship and transfers it to a transfer unit movable on the crane bridge. Said transfer trolley transfers this container, on land, to a second lifting unit, the so-called land trolley, which then sets down the container on land while the transfer trolley returns to the first lifting trolley.

In the known container loading/unloading crane, the rendezvous maneuvers between the transfer trolley and land trolley proceed as follows: the transfer trolley usually reaches the land trolley before the latter has completely lifted its load receiving means, also referred to as "spreader" in container terminology. The transfer trolley must therefore brake and wait until the spreader has been completely lifted. The transfer trolley then moves under the land trolley, so that the latter can receive the container. However, in order for the land trolley to be then able to lower the container in the direction of the quay, the transfer trolley must first have again vacated the space under the land trolley.

To move the transfer trolley under the land trolley, the large mass of the transfer trolley, including the mass of the container, must be accelerated and then braked, and also, to vacate the space under the land trolley, the large mass of the transfer trolley must first be accelerated. The acceleration of this large mass takes time, which contributes to a lengthening of the operating cycle of the container loading/unloading crane.

The transfer trolley of the known container loading/unloading crane is therefore designed in such a way that the problems described above in a rendezvous of the transfer trolley and water trolley do not occur. However, the known solution can not be used simultaneously on the water and land sides.

SUMMARY OF THE INVENTION

The object of the invention is therefore to make available a freight loading/unloading crane of the type described above with which the operating cycles for the loading and unloading of freight carriers, such as, for example, container ships, can be further reduced.

According to the invention, this problem is solved by the fact that an operating device is associated with the load receiving region, by means of which the load receiving surface, for load exchange with a front lifting unit, is adjustable in a forward direction between a transfer position and a front operating position, and, for load exchange with a back lifting unit, is adjustable in a backward direction between the transfer position and a back operating position.

In a rendezvous maneuver of the transfer trolley of the container loading/unloading crane according to the invention with the front lifting unit, i.e., for example, with the land trolley, the transfer trolley brakes immediately next to the land trolley. If the land trolley has then raised its lifting system to the highest position, then the operating device moves out and transfers a container to the lifting system or receives a container from the lifting system. After this, the operating device moves back into the transfer trolley. Following this, or simultaneously, the transfer trolley starts its travel to the water trolley.

Inasmuch as it is only necessary to move the operating device out and in, it is not necessary to accelerate the total mass of the transfer trolley in the container loading/unloading crane for the transfer or receipt of a container. The acceleration of the far smaller mass of the operating device requires less time, which results in shorter operating cycles, and, in addition, saves energy, which conventionally had to be expended for the acceleration of the large masses.

Furthermore, the equipping of the transfer trolley with an operating device also shows control-engineering advantages, because the control of the movements of the transfer trolley and the lifting systems of the land and water trolleys are separated, i.e., they can be carried out independently of each other. As described above, in the case of the conventional container loading/unloading crane, the transfer trolley must brake before the lifting trolley in question, wait for the complete lifting of the spreader, and finally move further until it is exactly below the lifting trolley, i.e., the movement of the transfer trolley must be carried out in coordination with the movement of the lifting system of the lifting trolley. According to the invention, the transfer trolley moves directly to its final position next to the lifting trolley. If the lifting system has reached its final position, i.e., its highest position, then, in response to a corresponding signal, the operating device is moved out.

According to another point of view, the invention relates to a freight loading/unloading crane, in particular a container loading/unloading crane, comprising a crane bridge with two longitudinal ends arranged at a distance from each other in a transfer direction, where at least one lifting unit movable on the crane bridge in the transfer direction is associated with each of the longitudinal ends, said lifting unit containing at least one lifting system with associated load receiving means, and a transfer unit, where the transfer unit and the lifting units are designed in such a way that loads can be exchanged between each of the lifting units and the transfer unit.

A freight loading/unloading crane of this type is known, for example, from German Patent No. 1,906,212. The known crane is used for the loading and unloading of container ships. For the unloading of a container ship, a first lifting trolley lifts a container from the cargo compartment of the ship and transfers it to a transfer trolley movable on the crane bridge. While the transfer trolley is transporting the container to the land, the first lifting trolley, which is now without a load, can already be lowered again in order to receive another container from the cargo compartment. On land, the transfer trolley transfers the container to a second lifting trolley, which sets the container down on land, while the transfer trolley returns to the first lifting trolley in an empty trip, i.e., without a container, in order to receive another container from the first lifting trolley. A corresponding procedure is followed for loading the ship.

As compared with a single-trolley container loading/unloading crane in which the same trolley carries out both the lifting function and the transfer function, the container loading/unloading crane described above has the advantage that the cycle time, i.e., the time that passes, for example, between two consecutive set-down processes of containers on land by the second lifting trolley, is significantly shorter than in the case of the single-trolley system, because the distances to be traveled by the single trolley, whether lifting distances or transport distances, are shorter than the distance to be traveled by the combined lifting and transfer trolley. However, both loading/unloading cranes share the serious disadvantage that each of the trolleys travels one-half of the distances in an unloaded state.

With respect to the single-trolley cranes, it has already been considered by loading/unloading specialists to use these in a so-called double-cycle operation. This refers to an operation in which the container ship is simultaneously loaded and unloaded, i.e., an operation in which one trolley initially receives a container to be unloaded (hereinafter referred to as "unloading container" for short) from the cargo compartment of the ship and sets it down on land, and immediately afterwards receives a container to be loaded (hereinafter referred to as "loading container" for short) on land and transports it to the cargo compartment. Corresponding considerations for multi-trolley loading/unloading cranes were not set up, because these cranes, e.g., the crane of the type-forming German Patent No. 1,906,212, are not suitable for double-cycle operation.

It is therefore another object of the invention to make available a freight loading/unloading crane according to the type with which the operating cycle times can be further reduced by the fact that load carriers, such as container ships, can be simultaneously loaded and unloaded in a double-cycle operation.

This problem is solved according to the invention by the fact that the transfer unit contains at least two load receiving regions with one load receiving area each, with the load receiving regions being arranged and/or designed in such a way that each of them can cooperate with each of the lifting units for the transfer of loads from the lifting units to the load receiving area and for the reception of loads by the lifting units from the load receiving area. As a result of these measures, each of the lifting units, upon encountering the transfer unit, can initially transfer to this the container carried by it into a first receiving region and can then, independently of this, remove the container delivered by the transfer unit from the second receiving region. In this way, both the lifting unit and the transfer unit arrive at the meeting point in a loaded state, exchange their loads there, and leave the meeting point again in a loaded state. In order to be able to carry out the load exchange with both lifting units in a time-saving manner, it is proposed that at least one of the load receiving regions contains an operating device by means of which the load receiving area for load exchange with a front lifting unit is adjustable in a forward direction between a transfer position and a front operating position and, for load exchange with a back lifting unit, is adjustable in a backward direction between the transfer position and a back operating position. The time saving in this case results from the fact that the displacement travels required for load exchange, in which the large mass of one of the units must be moved, can be avoided to a very large degree and only the mass of the particular load, which must be moved in any case, is moved.

In an embodiment of the operating device, it is proposed for all container loading/unloading cranes according to the invention that these contain at least one extendable element with a base part fastened to the transfer unit and at least one telescope part that is adjustable telescopically relative to the base part in the forward direction and backward direction. The load receiving area in this case can be formed by an area of the telescope part facing away from the base part.

In an alternative embodiment, the operating device can contain a platform which can be moved out on rails projecting from the receiving region in the forward and backward directions. This embodiment is characterized by a particularly high stability because of the fixedly attached rails.

In the alternative embodiment of the operating device, the platform may consist of a fixed plate which can be moved out on the rails by means of rollers attached to it, with the load receiving area consisting of an upper, horizontally proceeding surface of the fixed plate. The use of a platform of this type results in a stable and nevertheless space-saving structure of the operating device. In principle, however, it is also possible that the platform is formed by an endless belt drawn around a guide body which can be moved out by means of roller elements on the rails, with the load receiving area being formed by an upper, horizontally proceeding part of the endless belt.

In order to be able to reduce the number of displacement trips required for load exchange in the case of the container loading/unloading crane operable in a double-cycle operation as much as possible, in a first embodiment of the transfer unit it is provided that the two load receiving regions are arranged one above the other, with at least the lower load receiving region, and preferably both load receiving regions, containing an operating device.

In an embodiment of the transfer unit that is an alternative to this, it is provided that the two load receiving areas are fixed relative to the associated load receiving regions and are jointly swingable about an essentially horizontally proceeding axis, relative to the transfer unit, during which they maintain their orientation relative to the transfer unit.

In another alternative embodiment of the transfer unit, the two load receiving areas can be arranged in a fixed manner on an essentially horizontal turntable rotatable about an essentially vertically proceeding axis.

The invention also relates to a freight loading/unloading crane of the type cited, also operable in a double-cycle operation, in which the transfer unit contains a load receiving region and at least two lifting systems with associated load receiving means are associated with each of the longitudinal ends of the crane bridge, where each lifting system can cooperate with the load receiving region for the transfer of loads to the load receiving area and for receiving loads from the load receiving area, regardless of whether the other lifting system associated with the same longitudinal end of the crane bridge has received a load or not. By means of these measures, each of the lifting units, upon meeting with the transfer unit, can initially, with the currently empty load receiving means, receive the container delivered by the transfer unit from the load receiving region and can then transfer the container carried by the other load receiving means to the receiving region. It is thus also possible with the freight loading/unloading crane described above to simultaneously load and unload load carriers, such as, for example, container ships, in a double-cycle operation.

In all of the embodiments of the freight loading/unloading crane described above, the transfer unit can be designed so as to be displaceable in the transfer direction. This has the advantage that the distances to be traveled can be divided among all three units, lifting units and transfer unit, with a corresponding saving in time. A particularly simple structure is obtained if the transfer unit is displaceable in the transfer direction on a transport track running between the longitudinal ends of the crane bridge.

However, it is also possible that the transfer unit is made non-displaceable in the transfer direction. In this embodiment, the transfer function is also taken over by the two lifting units. This can be achieved in a simple manner by the fact that the transfer unit is fixedly attached to the crane bridge or to its lower crossbeams. However, it is also possible, alternatively, that the transfer unit is arranged so as to be movable on a foundation carrying the freight loading/unloading crane in a direction proceeding essentially orthogonally to the transfer direction. In both cases, the transfer unit can follow the freight loading/unloading crane during its movement along the quay, i.e., orthogonally with respect to the direction of the trolley travel. However, even a fixed arrangement on the foundation carrying the freight loading/unloading crane is conceivable.

According to another viewpoint, the invention relates to a process for the transport of loads between two horizontally separated load set-down regions in which, in both load set-down regions, the loads are lifted and in each case are transported along a first partial distance by means of a load-receiving and load-transport system associated with the first of the load set-down regions, and along a second partial distance by means of a load-receiving and load-transport system associated with the second of the load set-down regions, in which a transfer from the first load-receiving and load-transport system to the second load-receiving and load-transport system between the two partial distances takes place with the use of an intermediate carrier system, in which the intermediate carrier system, with the use of an operating device, receives loads from the two load-receiving and load-transport systems or transfers loads to these. Because only the operating device needs to be accelerated during the transfer or reception of loads but not the whole intermediate carrier system, the process according to the invention is characterized by short operating cycles.

The invention also relates to a process for the transport of loads between two horizontally separated load set-down regions in which, in both load set-down regions, the loads are lifted and in each case are transported along a first partial distance by a load-receiving and load-transport system associated with a first of the load set-down regions, and along a second partial distance by a load-receiving and load-transport system associated with a second of the load set-down regions, in which transfer from the first load-receiving and load-transport system to the second load-receiving and load-transport system between the two partial distances takes place with the use of an intermediate carrier system and in which the two load-receiving and load-transport systems transport a load both when approaching and when moving away from the intermediate carrier system. Thus, by means of the process according to the invention, load carriers with which one of the load set-down areas is associated, e.g., container ships, can be simultaneously loaded and unloaded in a double-cycle operation, for which purpose, for example, the lifting units described above can be used as load-receiving and load-transport systems, and the previously described transfer unit can be used as an intermediate-carrier system. Because the freight loading/unloading crane according to this process of the invention operates in a double-cycle operation, i.e., neither the intermediate carrier system nor the load-receiving and load-transport systems carries out empty trips, the operating cycles can be reduced significantly further.

BRIEF DESCRIPTION OF THE DRAWINGS

The invention will be explained in greater detail below, with reference to the attached drawing, in which.

DETAILED DESCRIPTION

Figure 1:
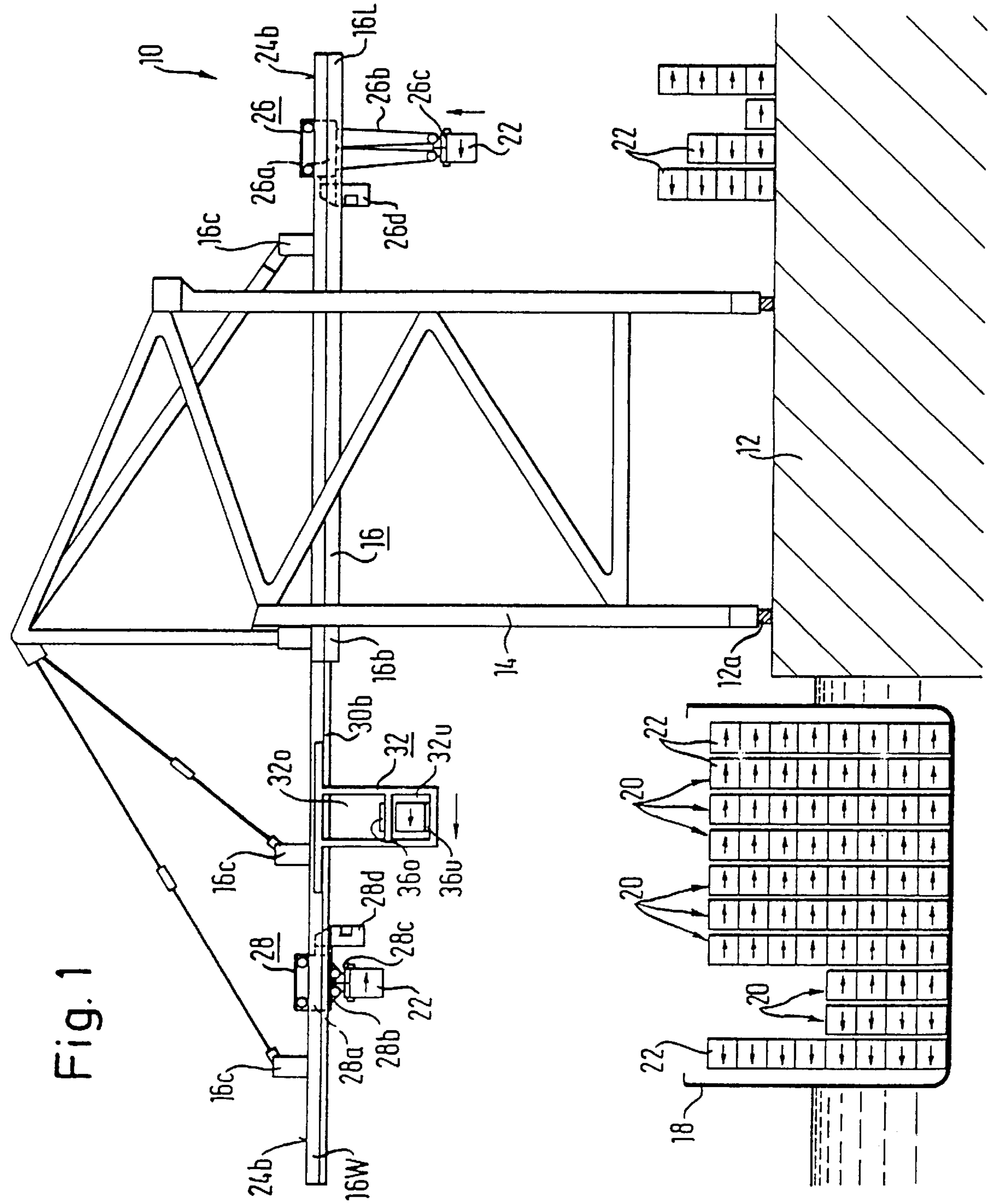
FIG. 1 shows a side view of a freight loading/unloading crane according to the invention used in a freight port in the operating position.

FIG. 1 shows a container loading/unloading crane generally designated by 10 for the simultaneous loading and unloading of container freighters in a double-cycle operation, as an example for a freight loading/unloading crane according to the invention. The container loading/unloading crane 10 comprises a crane structure 14 movable along a quay 12 on rails 12*a*, to which is attached a crane bridge 16.

On the quay 12, there lies a container ship 18 which receives containers 22 arranged above one another in stacks 20. The containers 22 can be seen in FIG. 1 with their narrow end view. Their longitudinal direction extends with the longitudinal direction of the ship 18 perpendicularly to the plane of the drawing. In addition, in FIG. 1, the containers 22 which are to be unloaded from the container ship 18 or have already been unloaded (hereinafter referred to as "unloading containers" for short) are identified by a small arrow directed toward the right, whereas the containers 22 with which the container ship 18 is to be loaded or has already been loaded (hereinafter referred to as "loading containers" for short) are identified by a small arrow pointing toward the left.

The crane bridge 16 of the container loading/unloading crane 10 contains a land-side part 16L and a water-side boom 16W. As is shown in particular in FIG. 2, the crane bridge 16 contains two bridge supports 16*a* and 16*b* proceeding essentially parallel to each other which are connected with each other by means of several connecting members 16*c*. At the top of the bridge supports 16*a* and 16*b* there are provided running rails 24*a* and 24*b* on which a land-side trolley 26 (hereinafter also referred to as "land trolley 26" for short) and a water-side trolley 28 (hereinafter also referred to as "water trolley 28" for short) can be freely moved. On the outsides of the bridge supports 16*a* and 16*b* facing away from each other, there are provided running rails 30*a* and 30*b*, for a transfer trolley 32 freely movable on these. The running rails 30*a* and 30*b* extend from the water-side end of the crane bridge 16 shown on the left of FIG. 1 to the land-side end of the crane bridge 16 shown on the right of FIG. 1.

The water trolley 28 comprises a chassis 28*a* on which is arranged a hoisting-cable system. The hoisting-cable system, which is not shown in detail, is looped into lifting blocks of the chassis 28*a* and is driven by a motor. The hoisting-cable system and motor together form a water-side lifting system 28*b*. To the lifting system 28*b* there is attached a container grasping frame 28*c* (also called "spreader" in container terminology), which is designed in such a way that it can grasp the container at its four upper corners by means of couplings (not shown in the figures).

The movement of the water trolley 28 on the running rails 24*a* and 24*b* and the operation of both the lifting system 28*b* and the spreader 28*c* can be controlled by an operator from a driver's cabin 28*d* via control lines (not shown).

When the lifting system 28*b* is caught up or released by the motor, then the spreader 28*c* will go up or down, respectively. When the chassis 28*a* with a stationary motor is moved along the boom 16W, then the height of the spreader does not change. The travel power necessary for travel along the boom 16W can be supplied to the water trolley 28, for example, by means of a sliding contact rail (not shown).

The water trolley 28, as a rule, executes only those movements along the boom 16W that are necessary to adjust the horizontal position of the spreader 28*c* carried by the lifting system 28*b* to the various container stacks 20, i.e., displacement travels normally amounting to only one stack width.

The land trolley 26 has a structure corresponding to that of the water trolley 28, i.e., the land trolley also contains a chassis 26*a*, a lifting system 26*b* arranged on this with a spreader 26*c*, and a driver's cabin 26*d* (see FIG. 1). The operation of the land trolley 26 also corresponds essentially to that of the water trolley 28; in particular, the land trolley 26, as a rule, executes displacement travels of only one container-stack width along the land-side part 16L of the crane bridge 16.

In order to be able to keep the lifting distances for the lifting systems 28*b* and 26*b* between the container ship 18 and crane bridge 16 and between the quay 12 and crane bridge 16 as short as possible, the crane bridge 16 is designed to be adjustable in height with respect to the crane structure.

The horizontal transport of the containers 22 along the crane bridge 16 is normally taken over by the transfer trolley 32, whose structure will be explained in greater detail with reference to FIG. 3*a*.

The transfer trolley 32 contains two vertically proceeding side walls 32*a* which are connected with each other by means of horizontally proceeding connecting bases 32*b* located at a distance from each other. The two side walls 32*a* and the two connecting bases 32*b* enclose a lower container receiving region 32*u*. The transfer trolley 32 also contains an upper container receiving region 32*o*, which is located above the upper connecting base 32*b* and between the side walls 32*a*. Containers 22 can be received in the container receiving regions 32*u* and 32*o* for transport along the crane bridge 16. Chassis 32*c* are arranged at the upper ends of the side walls 32*a*, by means of which the transfer trolley 32 can be moved horizontally on the running rails 30*a* and 30*b*.

In both receiving regions 32*u* and 32*o*, there is provided an operating device, 36*u* and 36*o*, respectively, consisting of a multiplicity of telescope forks 34. The term "operating" in this case refers to both the receiving of a container 22 from one of the trolleys 26 and 28 and its transfer into one of the receiving regions 32*u* and 32*o*, and also to the receiving of a container 22 from one of the receiving regions 32*u* and 32*o* and its transfer to one of the lifting trolleys 26 and 28. For load exchange with the water trolley 28, the operating devices 36*u* and 36*o* can be displaced between a transfer position shown in FIG. 3*a* and a water-side operating position shown in FIG. 3*b*, in which the operating device is moved out of the transfer trolley 32 in the direction of the arrow W. For a container exchange with the land trolley 26, the operating devices 36*u* and 36*o* can be displaced between the transfer position shown in FIG. 3*a* and a land-side operating position, in which the operating device is moved out of the transfer trolley 32 in the direction of the arrow L.

Figure 3A:
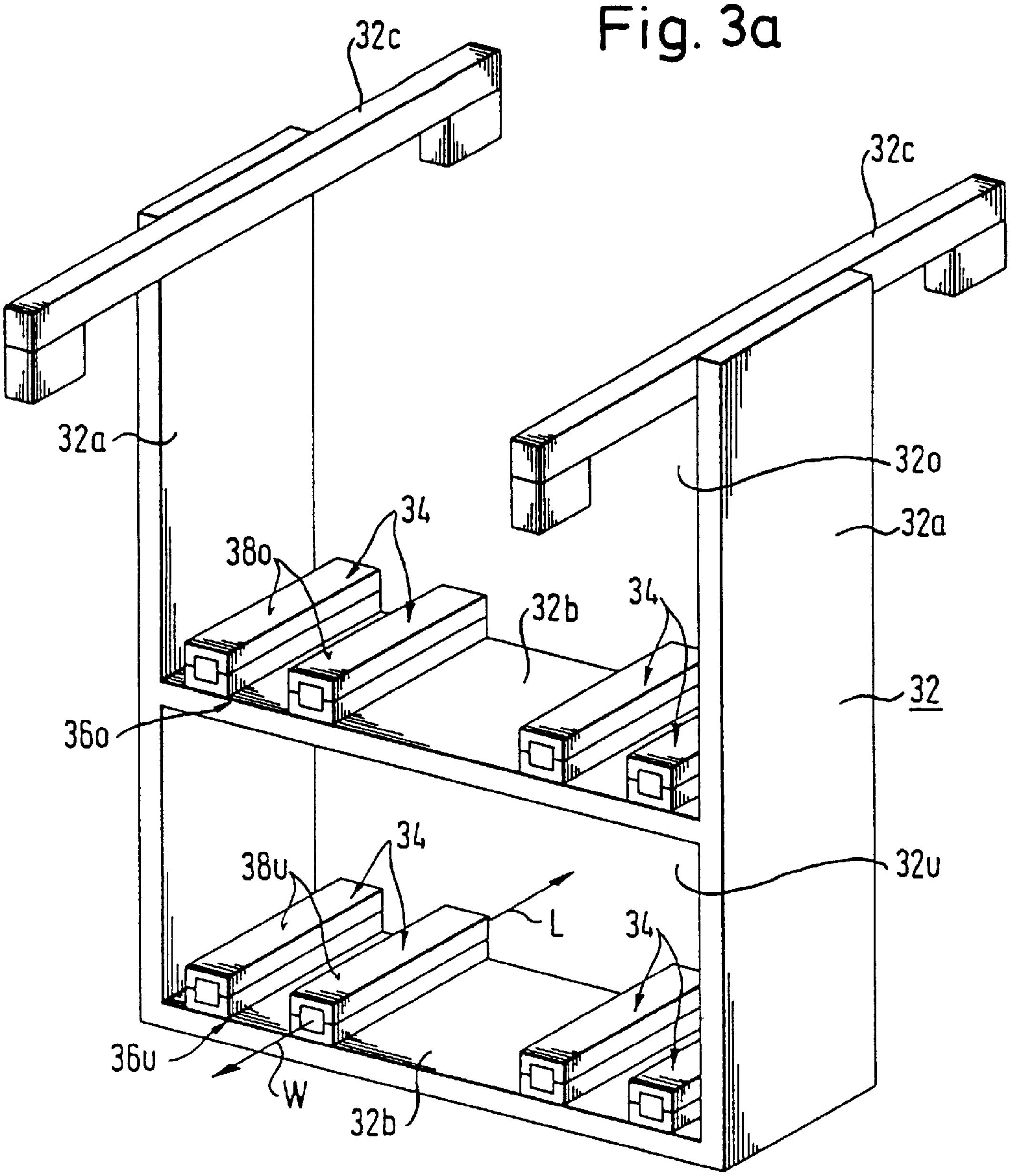
FIG. 3*a* shows a perspective view of a first embodiment of a transfer unit.
Figure 3B:
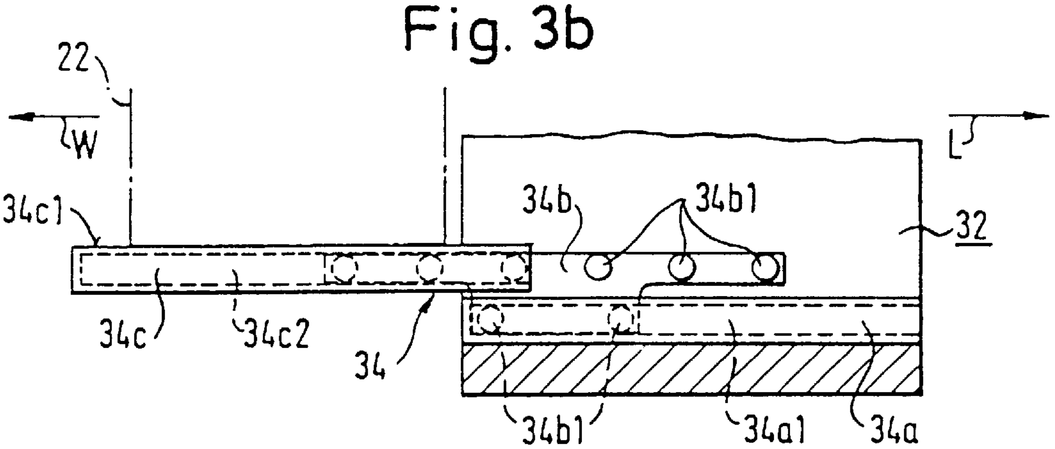
FIG. 3*b* shows a side view of a telescope unit of the transfer unit according to FIG. 3*a*, moved out into the water-side operating position.

As shown in FIG. 3*b*, each of the telescope forks 34 of the operating devices 36*u* and 36*o* consists of a lower guide rail 34*a* attached to the transfer trolley, an intermediate element 34*b*, and an upper guide rail 34*c*. On both sides of a longitudinal direction of the intermediate element 34*b* there are attached guide rollers 34*b*1 which engage with guide slots 34*a*1 and 34*c*2 of the guide rails 34*a* and 34*c*, respectively, and, together with these, make available the telescoping capability of the telescope forks 34. The top sides 34*c*1 of the upper guide rails 34*c* together form a lower container set-down area 38*u* and an upper container set-down area 38*o*, on each of which a container 22 can be set down.

For the sake of clearer representation, the drive of the telescope forks 34 is not shown in FIGS. 3*a* and 3*b*. This drive can be designed in a known manner, e.g., as a pneumatic or electric-motor drive or the like.

To receive an already lifted container 22 from one of the lifting trolleys 26 or 28, for example, into the lower receiving region 32*u*, the transfer trolley 32 first moves into the immediate vicinity of the lifting trolley. The telescope forks 34 of the lower receiving region 32*u* are then moved out into water-side or land-side operating position, depending on whether the container 22 is to be taken over by the water trolley 28 or the land trolley 26. As the next step, the container 22 is lowered by means of the lifting system 26*b* or 28*b* of the lifting trolley 26 or 28, until its lower edge 22*a* is in contact with the container set-down area 38*u* or 38*o*.

After separation and lifting of the spreader 26*c* or 28*c* of the lifting trolley, the container 22 is finally transported into the receiving region 32*u* by moving the telescope forks 34 into the transfer position.

In the transfer of a container 22 to one of the lifting trolleys 26 or 28, the steps described above are carried out correspondingly but in reverse sequence.

Figure 2:
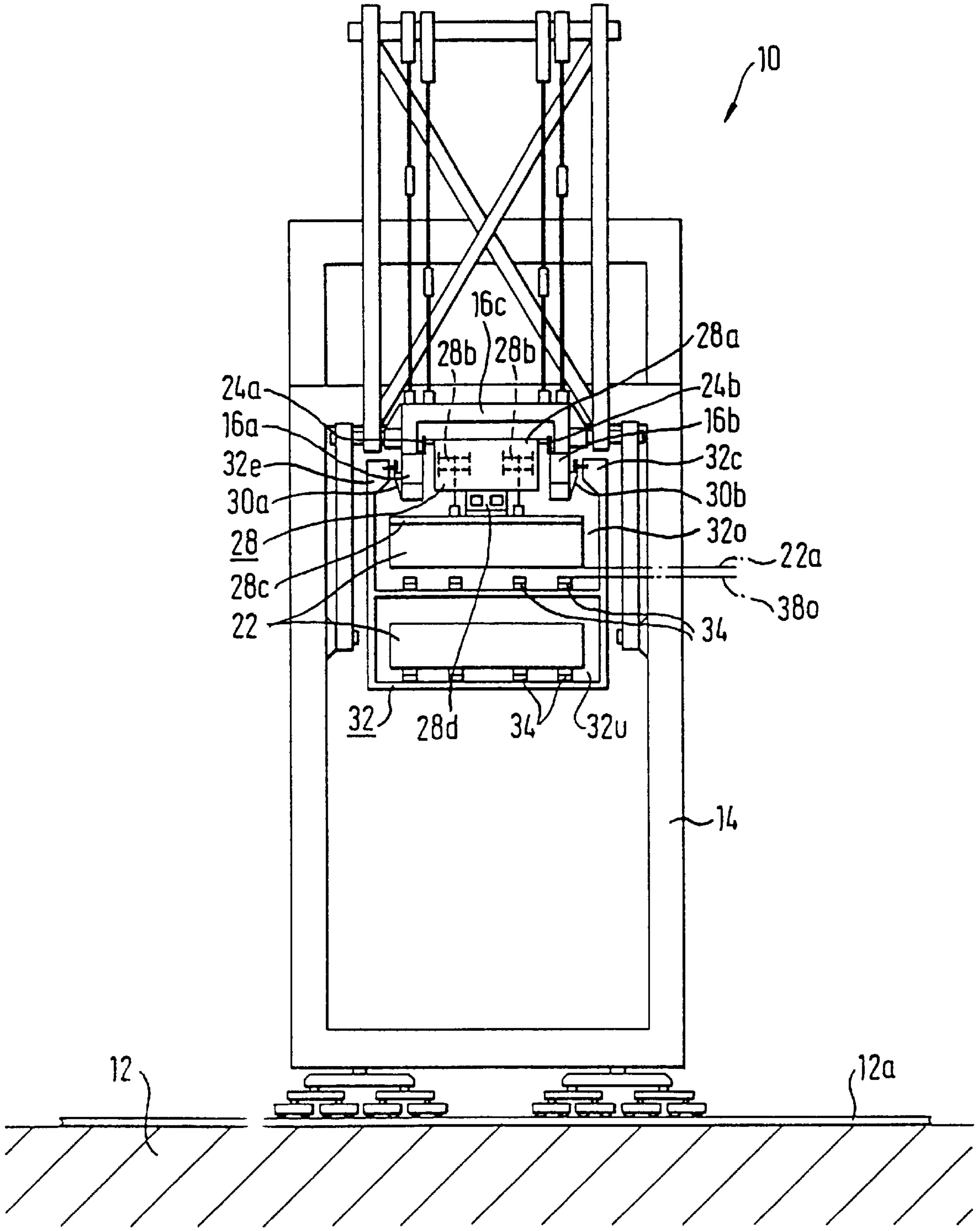
FIG. 2 shows an end view of the container loading/unloading crane according to FIG. 1, as viewed from the water side.

As is shown, in particular in FIG. 2, the container set-down area 38*o* of the upper receiving region 32*o* is located lower in a vertical direction than the lower edge 22*a* of a container 22 when this has been lifted as far as possible by one of the lifting trolleys 26 or 28 (by the water trolley 28 in FIG. 2). It is thus made certain that both receiving regions 32*u* and 32*o* can be operated equally by the lifting trolleys 26 and 28.

The loading and unloading of the container ship 18 in a double-cycle operation will be described below with reference to FIGS. 9*a* through 9*f*.

Figure 9A:
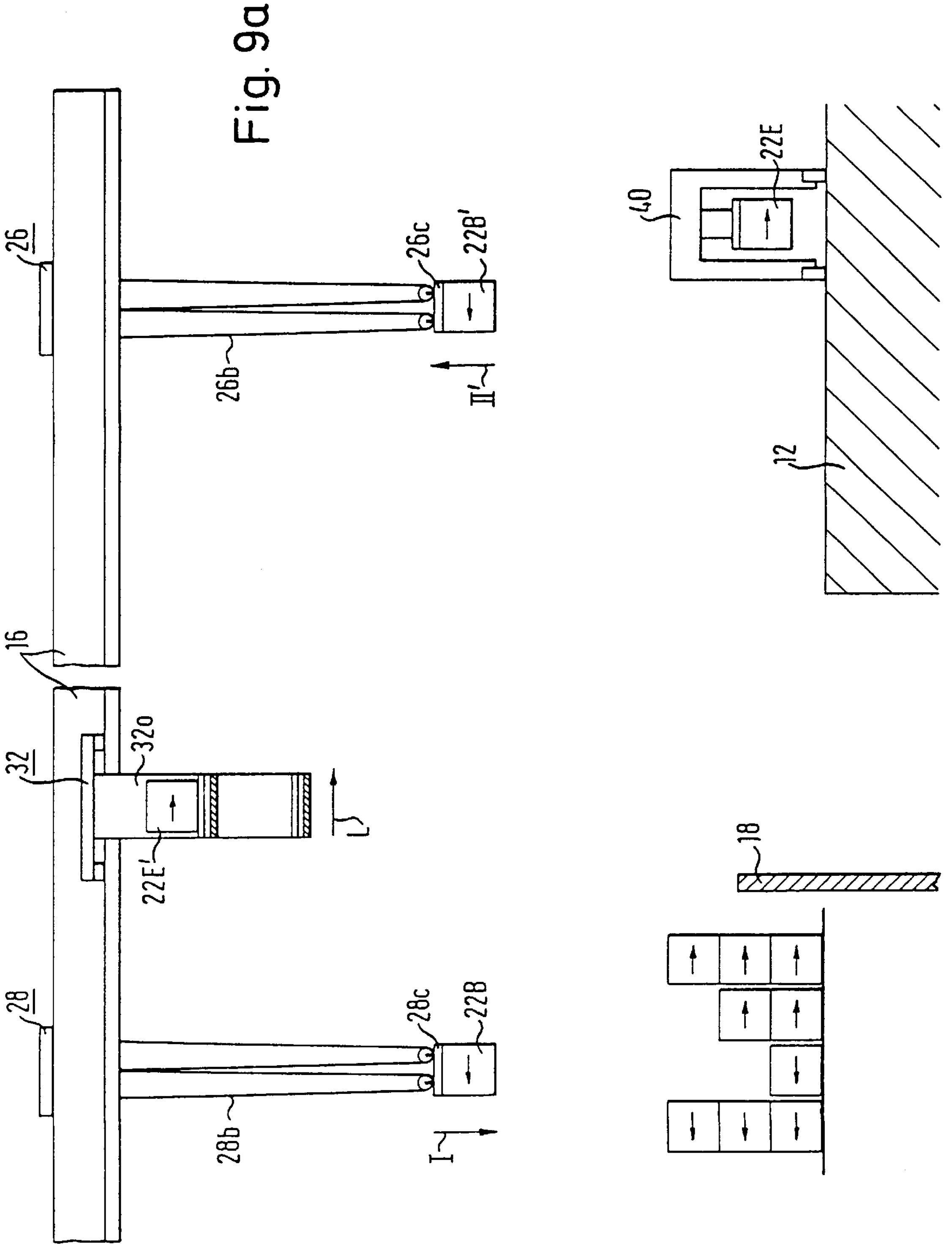
FIGS. 9*a* through 9*f* show schematic side views for the explanation of a double-cycle operation in the container loading/unloading crane according to FIG. 1.

We start here from a situation such as that shown in FIG. 9*a*. The water trolley 28 has just taken over a loading container 22B from the transfer trolley 32 and is in the process of lowering the container 22B by means of the lifting system 28*b*, as indicated in FIG. 9 a by means of an arrow I. Also, the transfer trolley 32 has taken over from the water trolley 28 an unloading container 22E' into the upper receiving region 32*o* and is engaged in land travel, i.e., it is moving with is the container 22E' along the crane bridge 16 in the direction of the land trolley 26, which is indicated in FIG. 9 a by means of the arrow L.

The land trolley 26 has taken up a loading container 22B' from the quay 12 and is just in the process of lifting this container by means of its lifting system 26*b*, as is indicated in FIG. 9*a* by means of an arrow II'. In the meantime, an unloading container 22E previously set down by the land trolley 26 is transported away from the quay 12 by a land-supported transport unit 40.

Figure 9B:
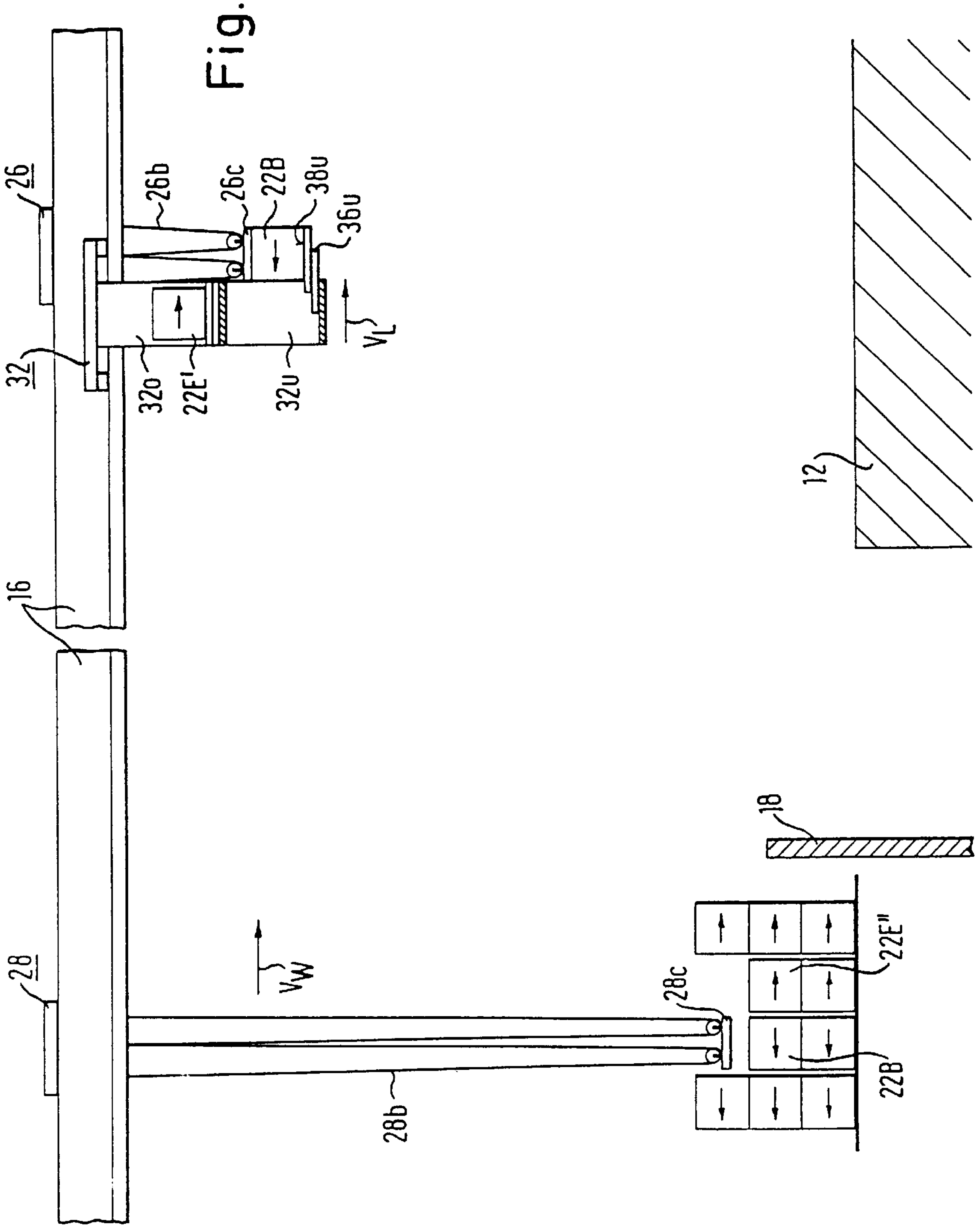

According to FIG. 9*b*, the land trolley 26 has lifted the loading container 22B' to a height corresponding to the level of the lower receiving region 32*u* of the transfer trolley 32. Also, the transfer trolley 32 has been moved directly up to the land trolley 26. The lower operating device 36*u* is now moved out on the land side and the land trolley 26 lowers the loading container 22B' until it comes to rest on the lower container set-down area 38*u*. The land trolley 26 and transfer trolley 32 then start a joint land-directed displacement travel amounting to slightly more than one container width, as is indicated in FIG. 9*b* by an arrow $V_L$. To carry out this displacement travel, it is of advantage if the transfer trolley 32 can be releasably bolted to the land trolley 26, so that a relative movement of the two trolleys 26 and 32 during the displacement travel is prevented.

The water trolley 28 has, in the meantime, unloaded the loading container 22B on the container ship 18 and is engaged in a land-directed displacement travel of one stack width (arrow $V_W$ in FIG. 9*b*) in order to receive the next unloading container 22E" with its spreader 28*c*.

Figure 9C:
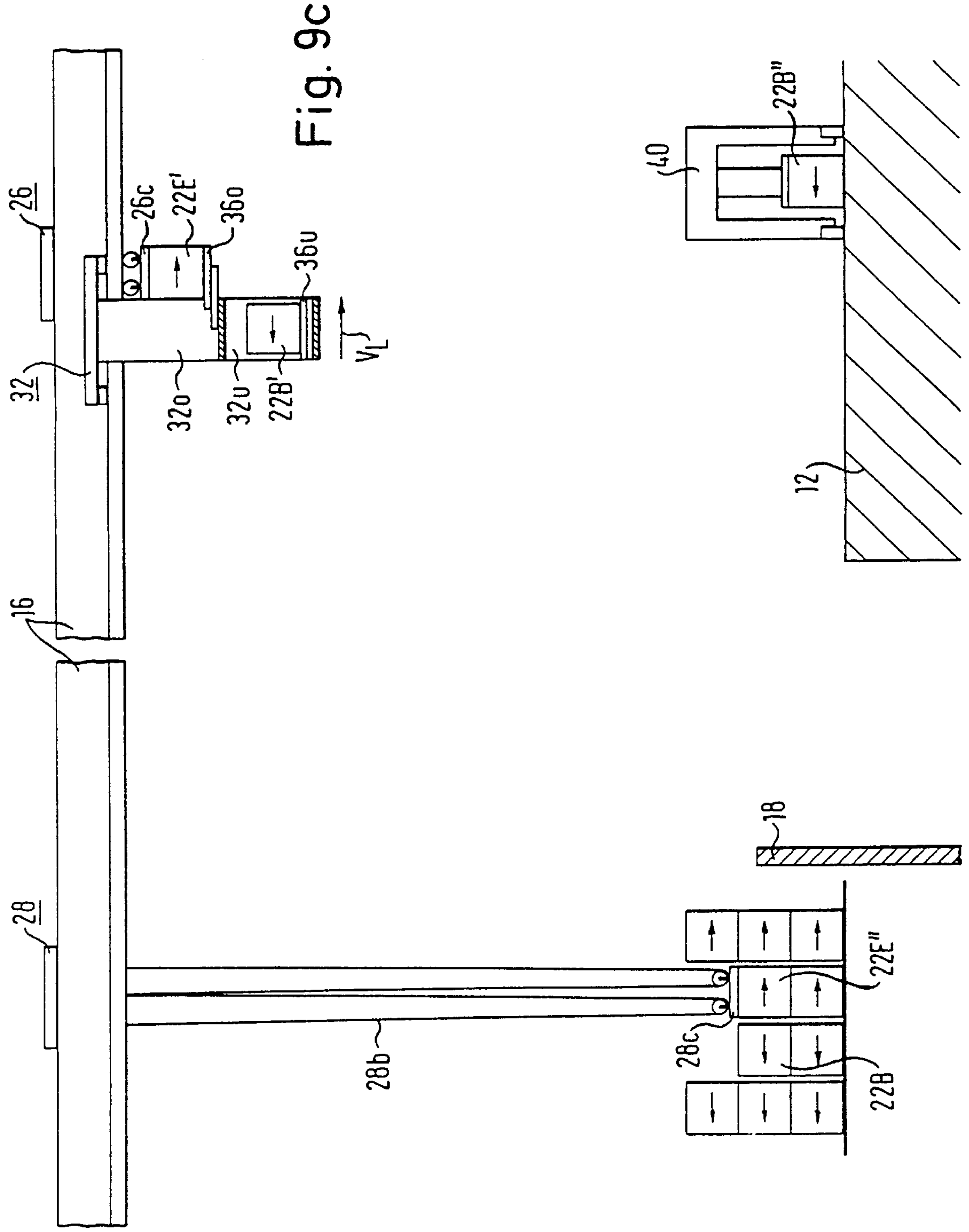

According to FIG. 9*c*, the spreader 28*c* of the water trolley 28 is coupled to the unloading container 22E". The spreader 26*c* of the land trolley 26 is separated from the loading container 22B' and the loading container 22B' is brought into the lower receiving region 32*u* of the transfer trolley 32 by means of the lower operating device 36*u*. After this, the spreader 26*c* is raised as much as possible, the unloading container 22E' is moved out of the upper receiving region 36*o* by means of the upper operating device 32*o*, and the spreader 26*c* is coupled to the unloading container 22E'. The upper operating device 36*o* is now recovered again. In the meantime, the transfer trolley 32 and land trolley 26 complete their joint displacement travel (arrow $V_L$). In addition, the next loading container 22B" is delivered by the transport unit 40 to the quay 12.

Figure 9D:
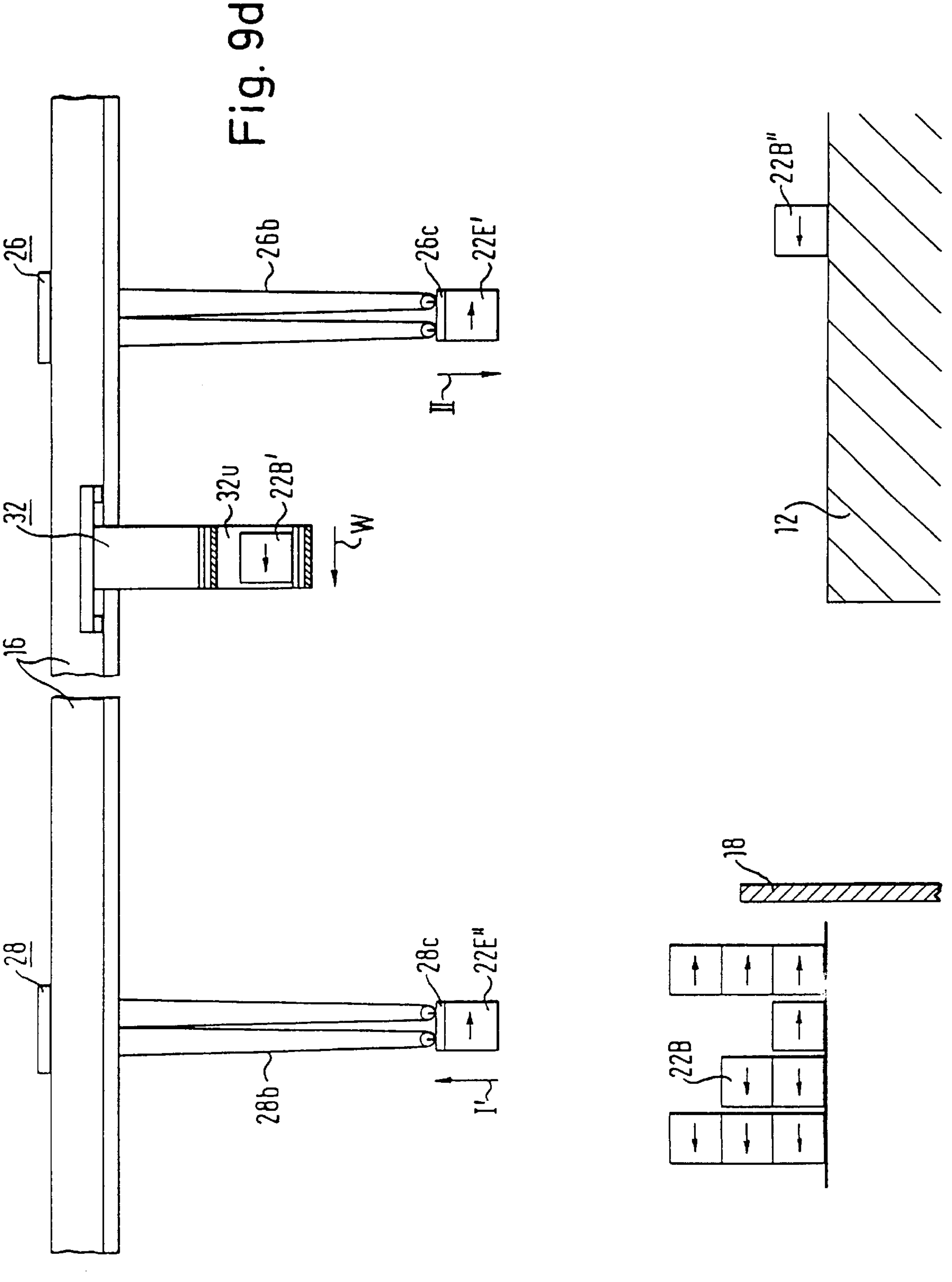

According to FIG. 9*d*, the transfer trolley 32 with the loading container 22B' is engaged in water travel, i.e., it moves with the container along the crane bridge 16 in the direction of the water trolley 28, which is indicated in FIG. 9*d* by means of the arrow W. At the same time, the land trolley 26 lowers the unloading container 22E' by means of its lifting system 26*b* (arrow II). In the meantime, the water trolley 28 lifts the unloading container 22E" by means of its lifting system 26*b* (arrow I').

Figure 9E:
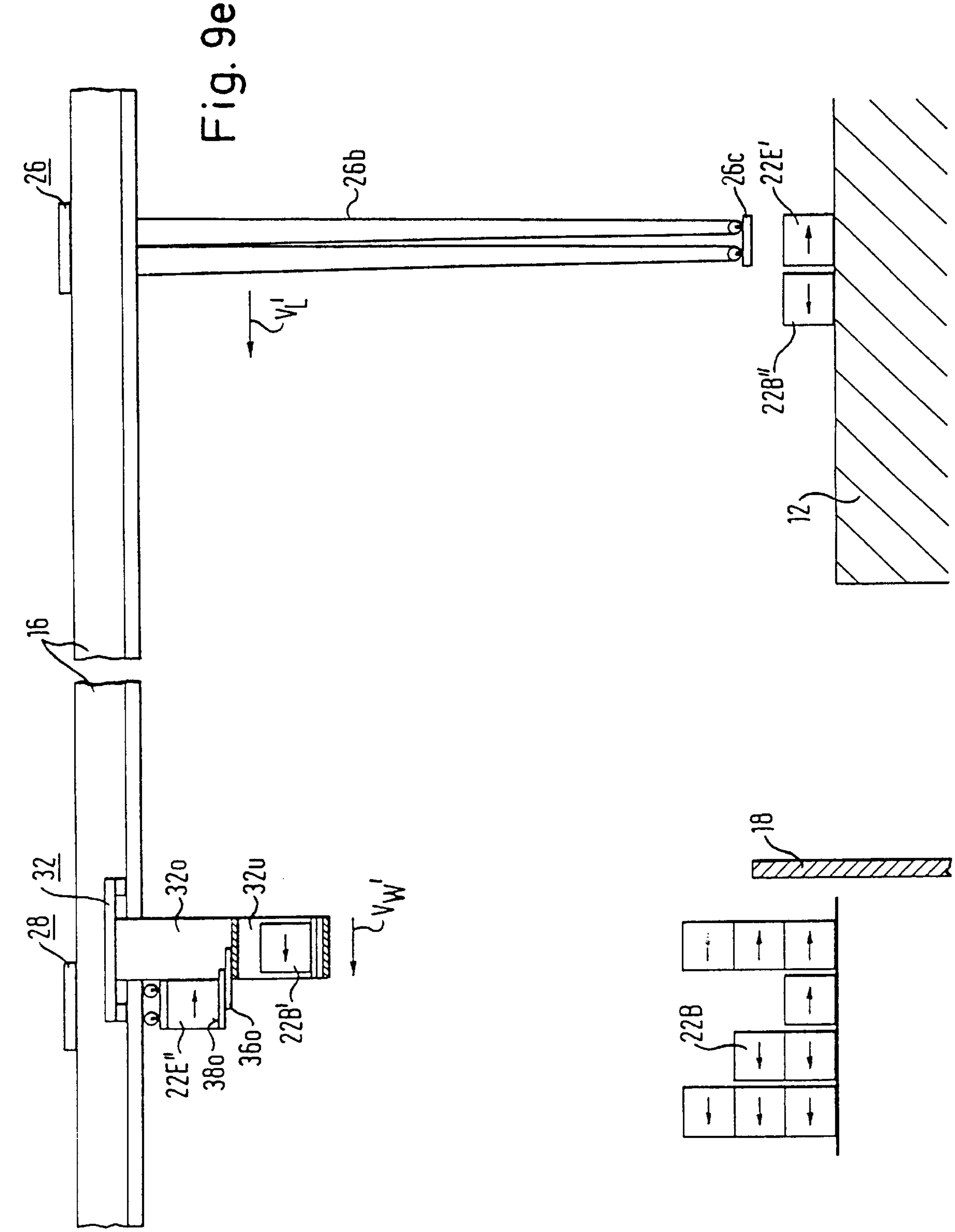

According to FIG. 9*e*, the water trolley 28 has lifted the unloading container 22E" as far as possible, i.e., to a height corresponding to the upper receiving region 32*o* of the transfer trolley 32. The transfer trolley 32 has also been moved directly up to the water trolley 28. The upper operating device 36*o* is now moved out in the water direction, and the water trolley 28 lowers the unloading container 22E" until it comes to rest on the upper container set-down area 38*o*. The water trolley 28 and transfer trolley 32 then start a joint water-directed displacement travel of one stack width, which is indicated in FIG. 9*e* by an arrow $V_W'$. To carry out this displacement travel, it is of advantage if the transfer trolley 32 can also be releasably bolted to the water trolley 28 so that a relative movement of the two trolleys 28 and 32 during the displacement travel is prevented.

The land trolley 26 has set down the unloading container 22E' on the quay 12 and has uncoupled its spreader 26*c* from it. It is in the process of a water-directed displacement travel (arrow $V_L'$ in FIG. 9*e*) of one stack width, in order to receive the next loading container 22B".

Figure 9F:
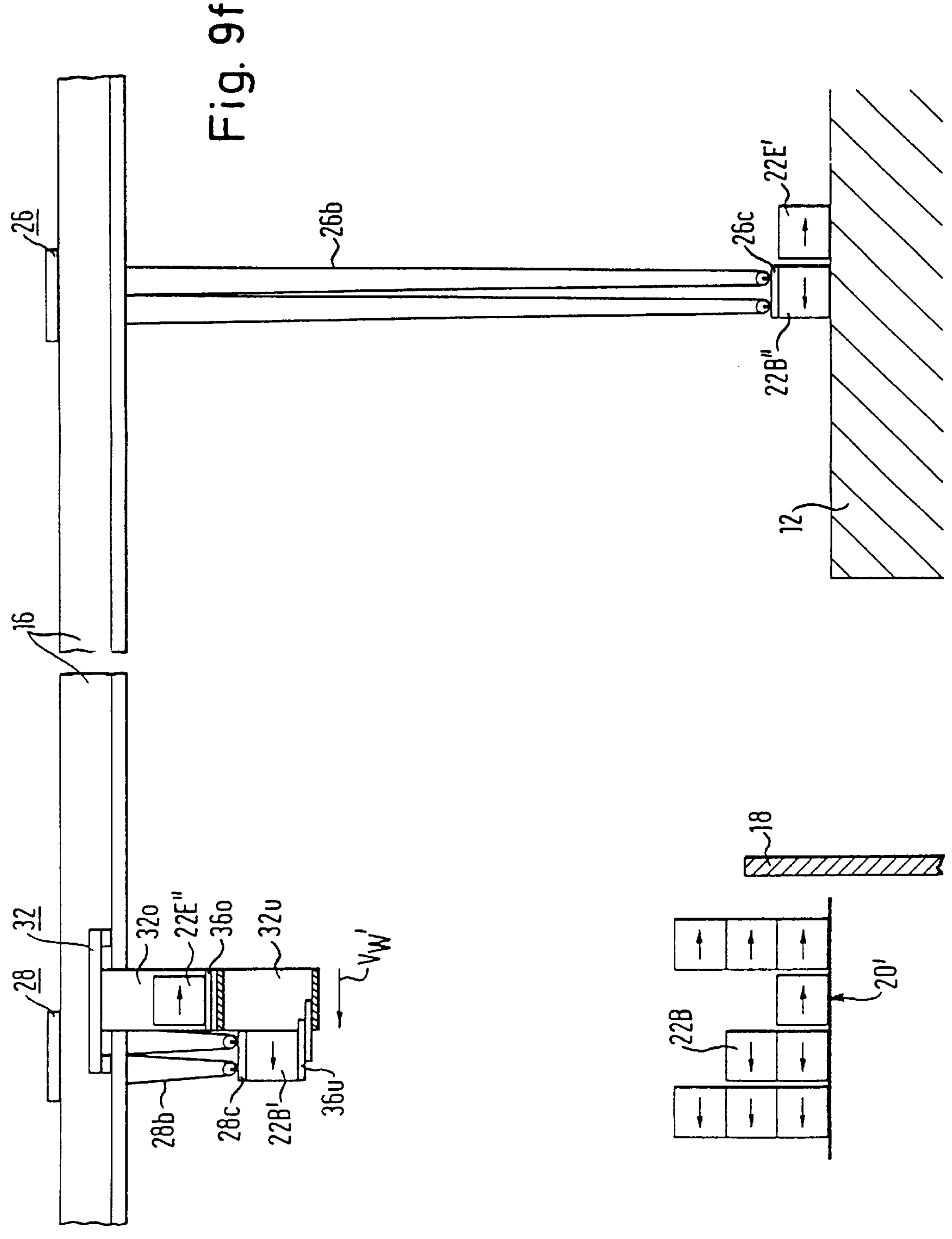

According to FIG. 9*f*, the spreader 26*c* of the land trolley 26 is coupled to the loading container 22B". The spreader 28*c* of the water trolley 28 is separated from the unloading container 22E" and the unloading container 22E" is brought into the upper receiving region 32*o* of the transfer trolley 32 by means of the upper operating device 36*o*. The loading container 22B' is then moved out of the lower receiving region 32*u* by means of the lower operating device 36*u*, and the spreader 28*c* is lowered and coupled to the loading container 22B'. In the meantime, the transfer trolley 32 and water trolley 28 complete their joint displacement travel (arrow $V_W'$). The lower operating device 36*u* is then again recovered.

The double-cycle loading and unloading process described above is repeated until the container ship 18 has been completely unloaded and, at the same time, completely loaded. Whenever an unloading container stack 20 has been completely removed from the container ship 18 (the next stack will be stack 20' in FIG. 9*f*), the water trolley 28 and transfer trolley 32 will not carry out any joint displacement travel, so that the filling of the created space with loading containers can be started immediately.

Figure 4:
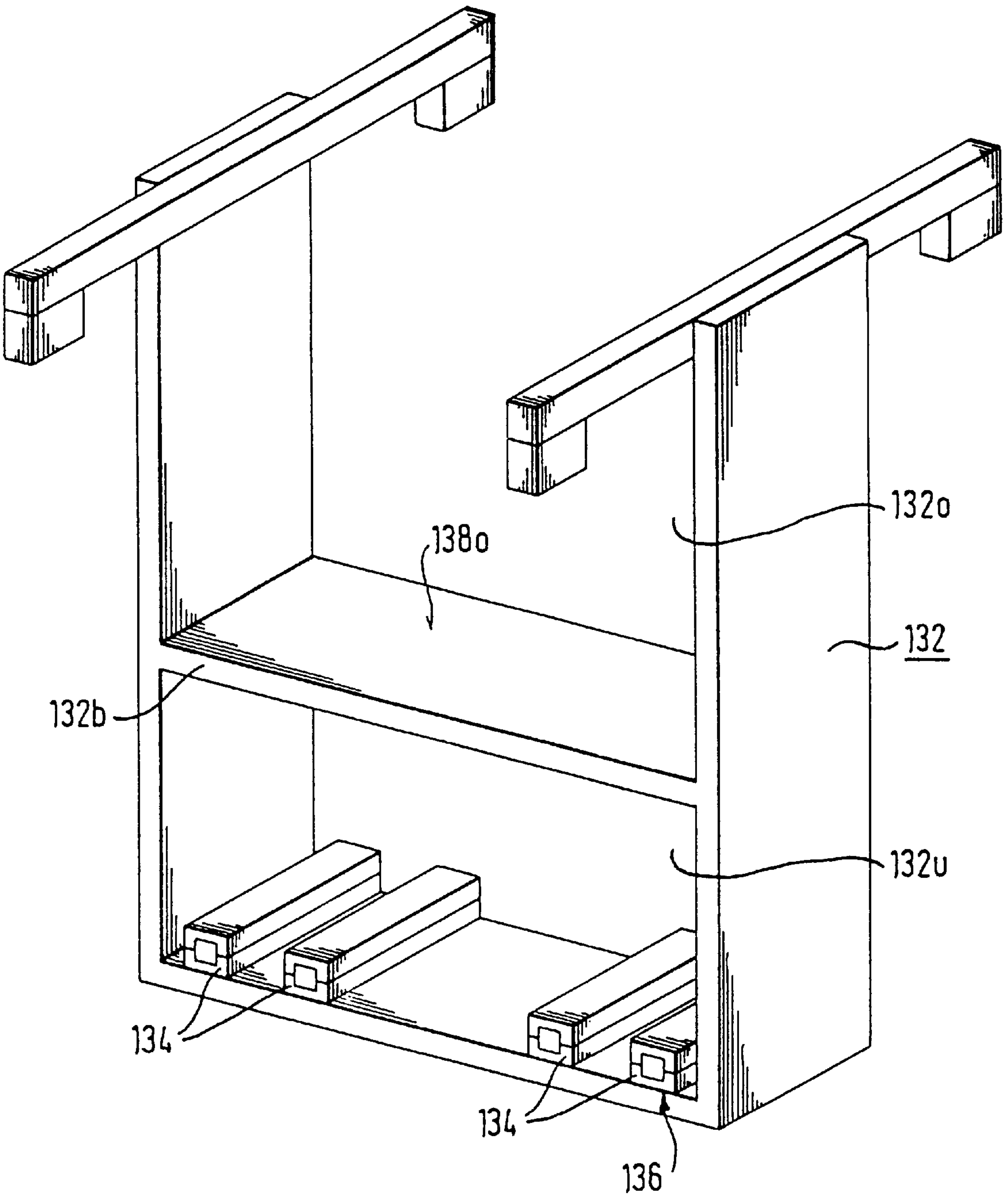
FIG. 4 shows a view, analogous to FIG. 3*a*, of a second embodiment of a transfer unit.

FIG. 4 shows a second embodiment of a transfer trolley, in which analogous parts have been designated by the same reference numbers as in FIGS. 1 through 3, but with the addition of 100 to each number.

Because the transfer trolley and lifting trolleys in general are designed in such a way that the transfer trolley can be moved past the lifting trolleys without problems, as long as the lifting systems of the lifting trolleys are essentially completely raised (cf., in particular, FIG. 2), it is possible to equip only the lower receiving region 132*u* of the transfer trolley 132 with an operating device 136 (in the present case, in the form of telescope forks 134). No operating devices are provided in the upper receiving region 132*o*.

In this embodiment, the transfer of containers into the upper receiving region 132*o* can be carried out by first moving the transfer trolley 132 directly underneath a particular lifting trolley, when this has lifted a container as far as possible. The container is then lowered by means of the lifting system of the lifting trolley until the lower edge of the container is in contact with the upper container set-down area 138*o* which is formed by the top of the upper connecting base 132*b*. After separation and lifting of the spreader, the transfer trolley 132 can finally be moved away again with the container or the transfer trolley 132 or the lifting trolley in question can carry out a displacement travel of approximately one container width. To receive a container from the upper receiving region 138*o*, the steps described above are carried out correspondingly, but in reverse sequence.

In principle, the method of operation described above for the transfer trolley 132 can also be carried out with the transfer trolley 32 according to FIG. 3*a*.

Figure 5A:
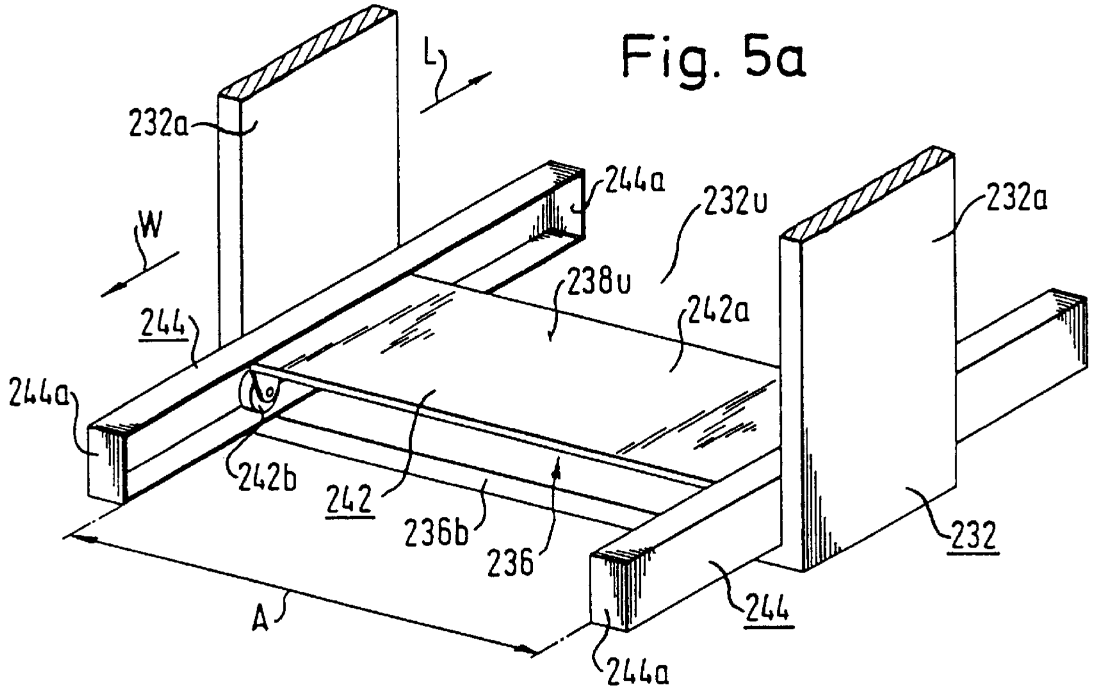
FIG. 5*a* shows a perspective partial view of a third embodiment of a transfer unit.

FIG. 5*a* shows a third embodiment of a transfer trolley in which analogous parts have been designated by the same reference numbers as in FIGS. 1 through 3, but with the addition of 200 to each number.

The embodiment according to FIG. 5*a* differs from the embodiments described above by the structure of the operating device 236. The operating device 236 comprises a roll-out table 242 with a roll-out table plate 242*a* and rollers 242*b* attached to its underside, only one of which is shown in FIG. 5*a*. The rollers 242*b* can be driven by a drive (not shown), e.g., an electric motor. The operating device 236 also includes two beams 244 with an essentially U-shaped cross-section, which are attached to the transfer trolley 232 in such a way that the base leg of the U shape of each of the beams 244 is in contact with an associated side wall 232*a* and one of the side legs of the U shape is in contact with the connecting base 232*b*, with the open sides of the U shape being arranged so as to face each other. The roll-out table 242 is dimensioned such that it engages with the beams 244, and the rollers 242*b* stand on the side leg in contact with the connecting base 232*b*. To enable the roll-out table 242 to be moved out of the transfer trolley 232 on the water side (arrow W) and land side (arrow L), the two beams 244 project beyond the side walls 232*a* of the transfer trolley 232 on the water side and land side. The length of the beams 244 in this case is dimensioned such that the roll-out table 242 can be moved out into an operating position, e.g., the water-side operating position shown in FIG. 5*b*, for container exchange with one of the lifting trolleys 26 or 28. In order to be able to prevent a dropping-out of the roll-out table 242 from the beams 244, the latter are closed at both ends by means of end covers 244*a*. FIG. 5*c* shows the transfer position of the roll-out table 242.

Figure 5B:
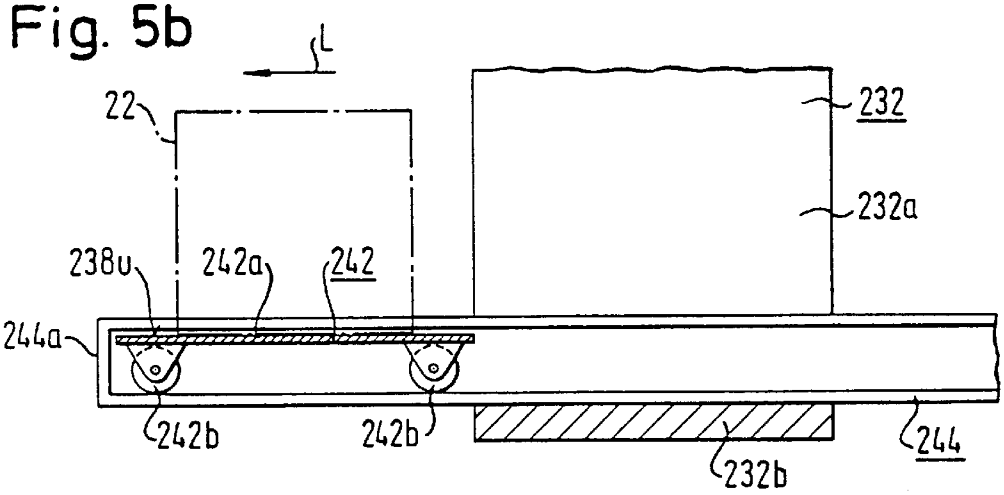
FIG. 5*b* and 5*c* show sectional views, taken along a median plane of the transfer unit according to FIG. 5*a*, in which the operating device is in the water-side operating position (FIG. 5*b*) or in the transfer position (FIG. 5*b*) [sic]
Figure 5C:
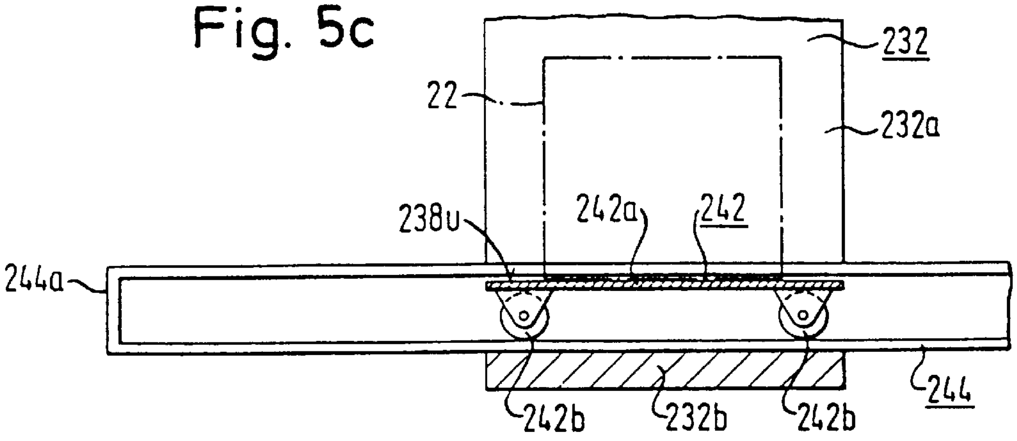

Although the operating device 236 is shown as associated with the lower receiving region 232*u* in FIGS. 5*a* through 5*c*, it can also be used for operation of the upper receiving region if the beams 244 are at a sufficient distance A from each other (see FIG. 5*a*) so that a container 22, with the spreader 26*c* or 28*c* coupled to it, can be moved through between them.

Figure 6A:
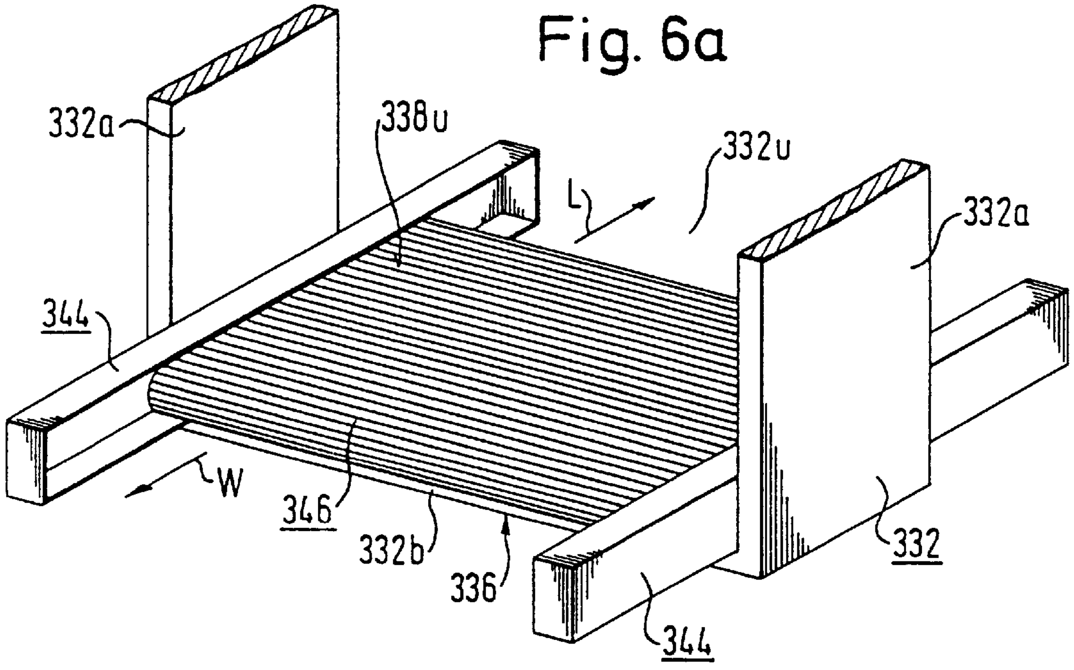
FIGS. 6*a* through 6*c* are views analogous to FIGS. 5*a* through 5*c* of a fourth embodiment of a transfer unit.

FIG. 6*a* shows a fourth embodiment of a transfer trolley in which analogous parts have been designated by the same reference numbers as in FIGS. 1 through 3, but with the addition of 300 to each number.

The embodiment according to FIG. 6*a* differs from the previously described embodiment according to FIG. 5*a* by the fact that, instead of the roll-out table 242, a platform conveyor 346 engages in a rolling motion with the beams 344, which correspond to the beams 244 according to FIG. 5*a*. The platform conveyor 346, according to FIG. 6*b*, comprises a guide body 346*a* with two drive rollers 346*b* which can be driven by a drive (not shown), e.g., an electric motor. The drive rollers 346*b* are located on the narrow sides of the guide body 346*a* which are at a distance from each other, with axes proceeding essentially parallel to each other, with the longitudinal ends of the drive rollers 346*b* engaging with the beams 344. An endless belt 346*c* is clamped around the drive rollers 346*b* and the guide body 346*a*. The endless belt 346*c* consists of a multiplicity of individual plates 346*d* (FIG. 6*b*) whose dimension in the axial direction of the drive rollers 346*b* is considerably greater than their dimension transverse to this axial direction and which are flexibly connected with each other.

Figure 6B:
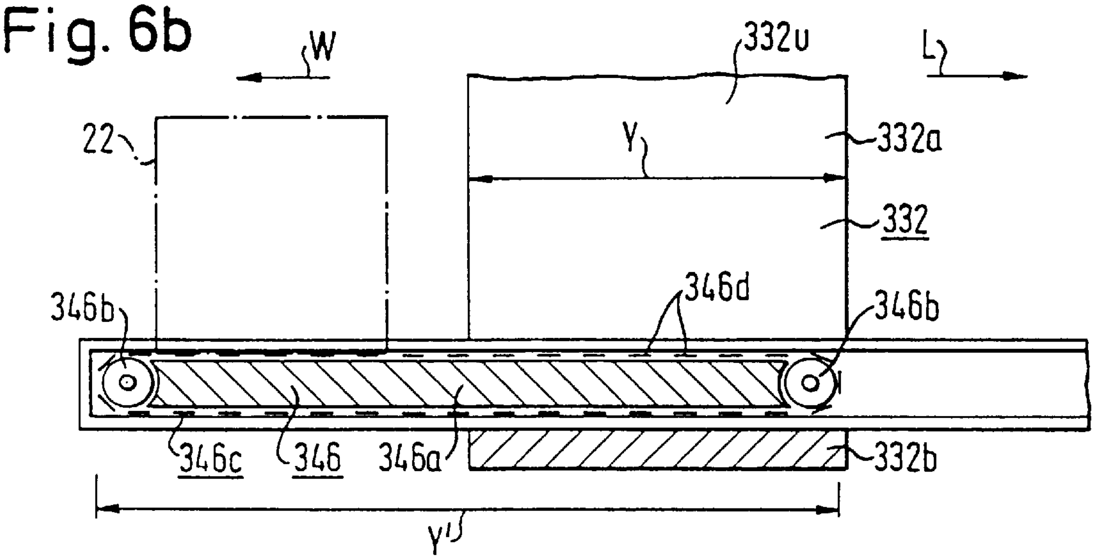
Figure 6C:
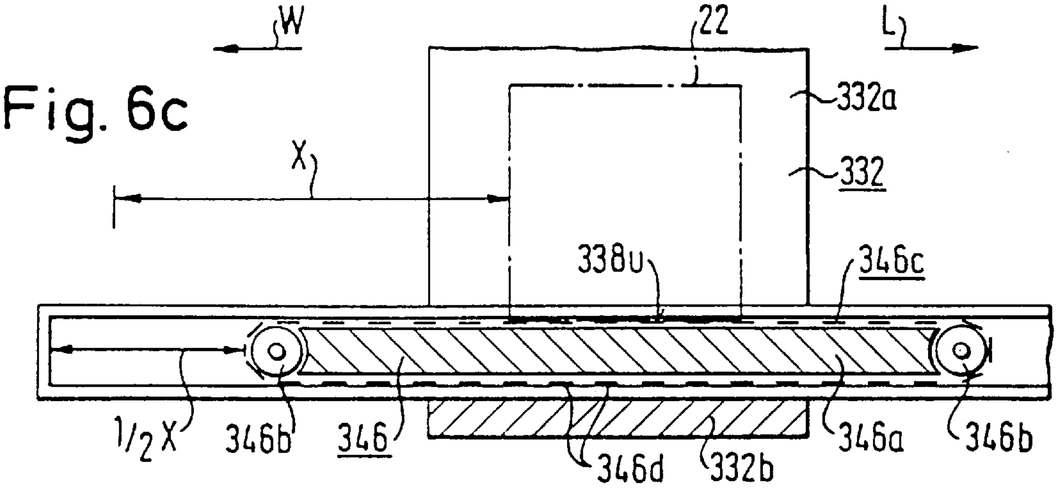

Because of the design of the platform conveyor 346, the guide body 346*a* of the platform conveyor 346 must be moved by a distance of only ½ X (see FIG. 6*c*) if the endless belt 346*c* is to be moved by a distance X, in order to transfer a container 22 from the water-side operating position according to FIG. 6*b* to the transfer position according to FIG. 6*c*. An analogous situation applies for the transfer between the land-side operating position and the transfer position. The dimension Y' of the platform conveyor 346 in the longitudinal direction of the beams 344 must therefore be approximately twice as great as the dimension Y of the receiving region 332*u* in this direction (compare FIG. 6*b*). In its transfer position according to FIG. 6*c*, the platform conveyor 346 therefore projects from the particular receiving region on both the land and water sides. Because of this projection, the operating device 336 is preferably used only in the lower receiving region 332*u*, although it is possible in principle to move out a platform operating device associated with the upper receiving region, e.g., into the water-side operating position (analogous to FIG. 6*b*), if a container is to moved into the lower receiving region on the land side or is to be removed from it.

It must be emphasized that the different embodiments of operating devices described above with reference to FIGS. 3*a* through 6*c* can be combined with each other in any desired manner. As an example, we shall merely mention a transfer trolley in which the upper receiving region is equipped with a telescope fork operating device according to FIGS. 3*a* and 3*b*, and the lower region is equipped with a roll-out table operating device according to FIGS. 5*a* through 5*c*.

Figure 7B:
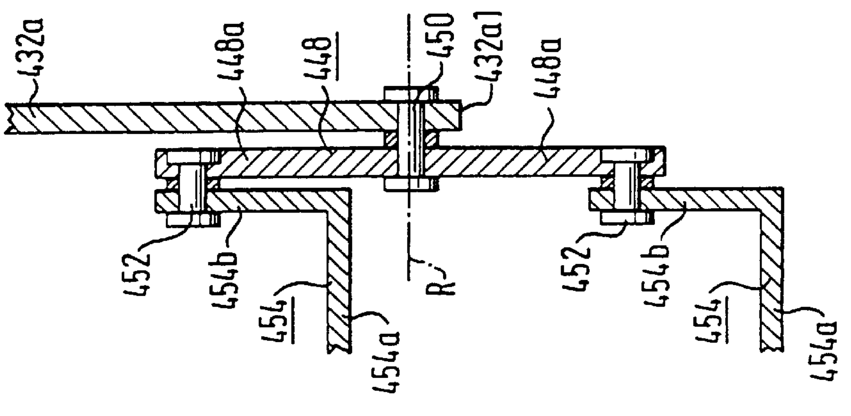
FIG. 7*b* shows a partial sectional view of the transfer unit according to the line VII—VII.
Figure 7A:
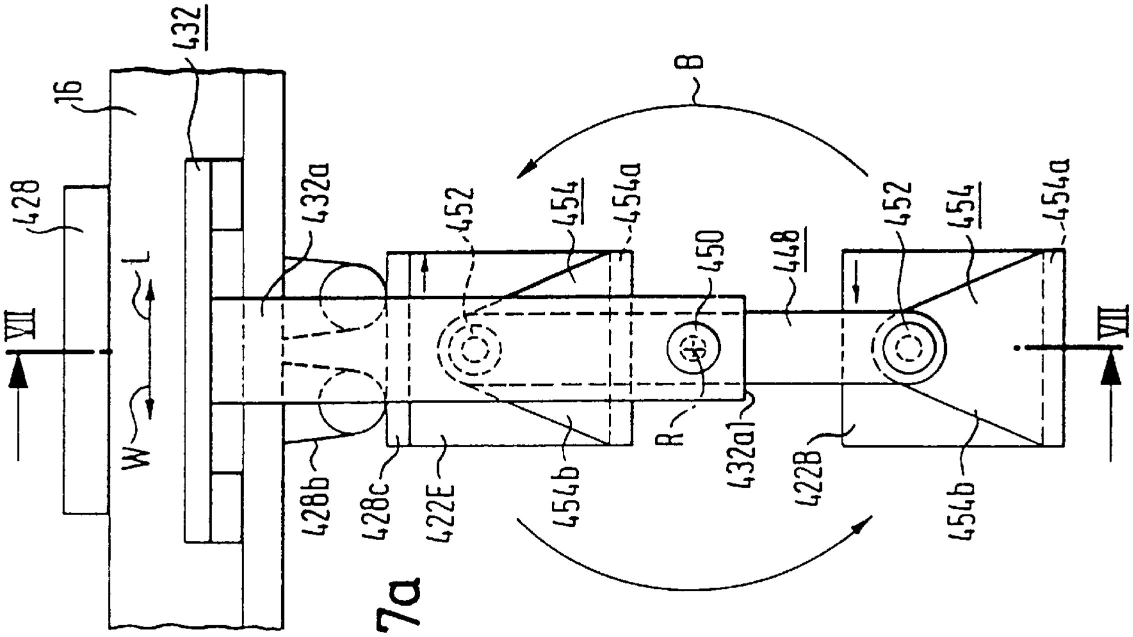
FIG. 7*a* shows a side view of a fifth embodiment of a transfer unit.

FIGS. 7*a* and 7*b* show a fifth embodiment of a transfer trolley in which analogous parts have been designated by the same reference numbers as in FIGS. 1 through 3, but with the addition of 400 to each number.

The transfer trolley 432 comprises two side parts 432*a* at the lower ends 432*a*1 of which an extended hinged support 448 is held by means of a pivot 450 so as to be rotatable about a horizontal axis of rotation R proceeding orthogonally to the transfer direction (double arrow WL) (compare FIG. 7*b*). The pivot 450 passes through the hinged support 448 in such a way that the latter is divided into two legs 448*a* of essentially equal length. Each of these legs 448*a* is traversed at its end facing away from the pivot 450 by another pivot 452, on which swinging units 454 are held so as to be rotatable about axes proceeding essentially parallel to the axis of rotation R. Each of the swinging units 454 contains a swinging bottom 454*a* and also two swinging side parts 454*b* for connection with the pivots 452. A drive (not shown) is also provided, by means of which the hinged supports 448 associated with the two side parts 432*a* can be put into rotation (arrows B in FIG. 7*a*). As a result of this rotation, the two swings 454 are swung about the axis of rotation R in the manner of a Ferris wheel. The swings 454 are designed in such a way that their centers of gravity in both the unloaded state and when loaded with a container are located below the swiveling axis established by the associated pivots 452. In this way, it is made certain that the swings 454 automatically maintain their orientation relative to the transfer trolley 432.

When the transfer trolley 432 described above is used, the exchange of a loading container 422B and an unloading container 422E between the transfer trolley 432 and water trolley 428 can be carried out, for example, as explained below:

The transfer trolley 432, on whose at this point lower swing 454*a* loading container 422B taken over from the land trolley (not shown) is located, is moved directly underneath the water trolley 428, which, by means of the lifting system 428*b* and spreader 428*c*, has lifted an unloading container 422E as far as possible. This unloading container 422E is set down by the water trolley 428 on the upper swing 454, which is empty at this time. After this, the hinged support 448 is rotated by means of the drive (not shown) about the axis of rotation R, until the two swings 454 have interchanged their positions. The swing 454 carrying the loading container 422B is now in the upper position, and the swing 454 carrying the unloading container 422E is in the lower position, so that the water trolley 428 can take over the loading container 422B from the now upper swing 454. Finally, the transfer trolley 432 with the unloading container 422E is again moved in the direction toward the land trolley, and the water trolley 428 lowers the loading container 422B into the container ship. The load exchange with the transfer trolley takes place in a corresponding manner.

Figure 8A:
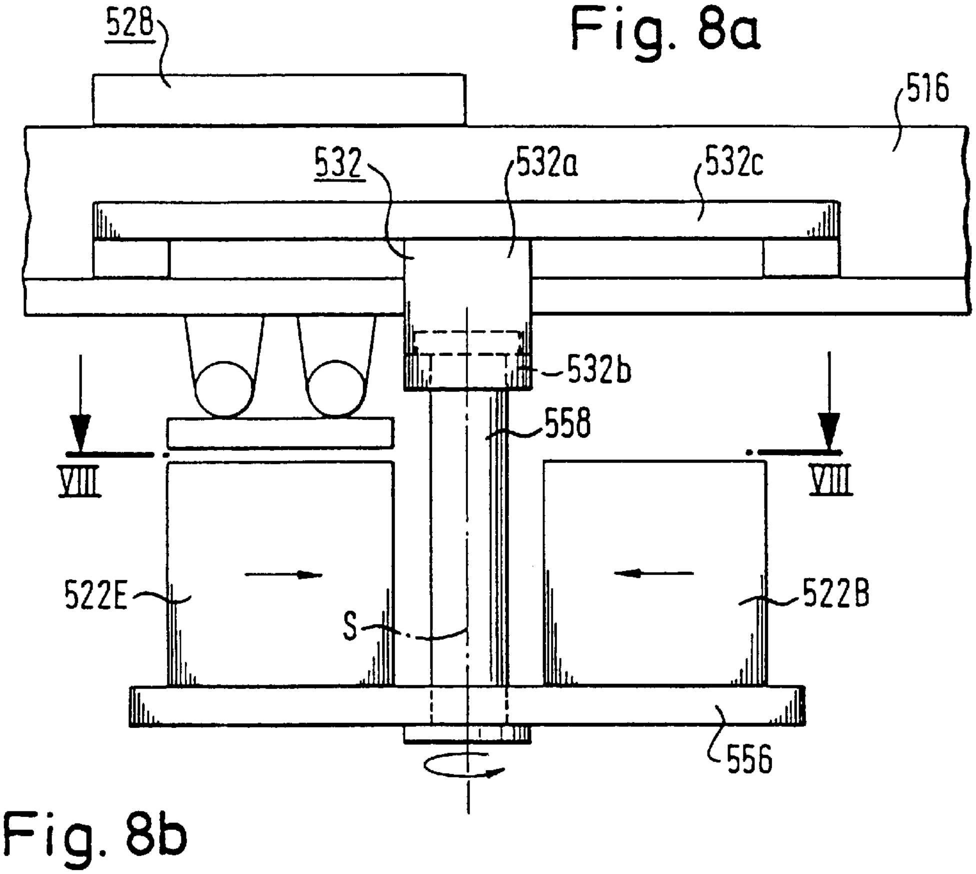
FIG. 8*a* shows a side view of a sixth embodiment of a transfer unit.
Figure 8B:
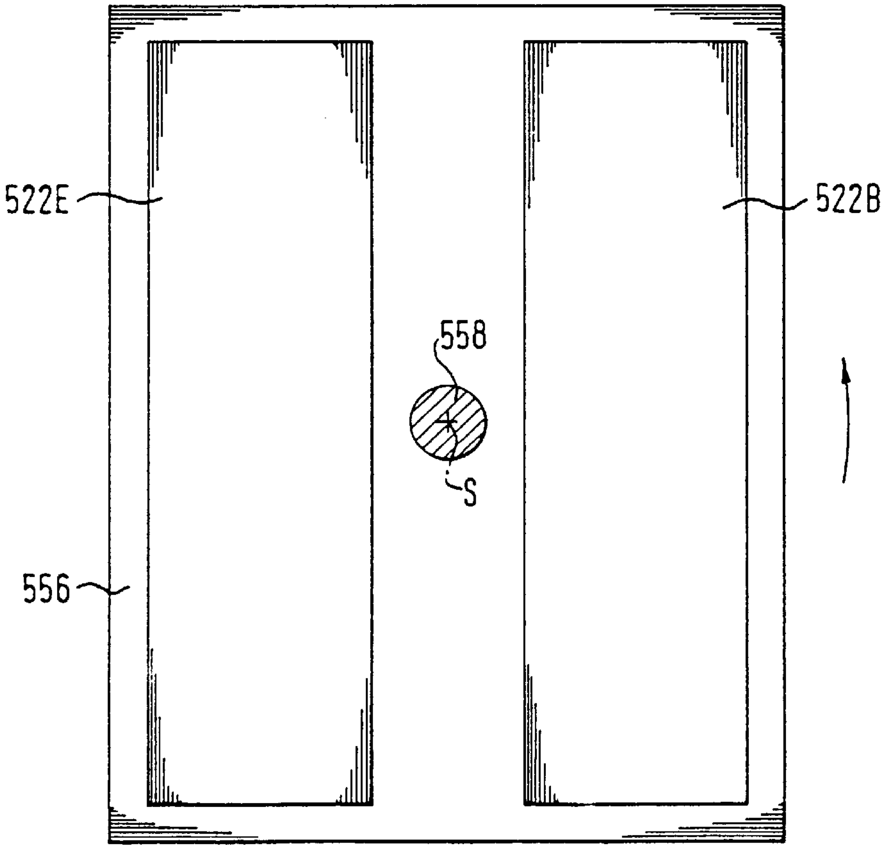
FIG. 8*b* shows a sectional view of the transfer unit according to FIG. 8*a* along the line VIII—VIII.

FIGS. 8*a* and 8*b* show a sixth embodiment of a transfer trolley in which analogous parts have been designated by the same reference numbers as in FIGS. 1 through 3, but with the addition of 500 to each number.

The transfer trolley 532 according to FIG. 8*a* differs from the transfer trolley according to FIG. 7*a* by the fact that the loading container 522B and the unloading container 522E do not interchange their positions as described above, in the manner of a Ferris wheel, by rotation about a horizontally proceeding axis of rotation R, but do so in the manner of a merry-go-round, by rotation about a vertical axis of rotation S. For this purpose, the transfer unit 532 is equipped with a turntable 556 which is held by an axis or shaft 558 from the connecting base 532*b* connecting the side parts 532*a* of the transfer trolley 532, so as to be rotatable about the axis S. In order to be able to ensure that the transfer trolley 532 can be moved in a steady manner on the crane bridge 516 even when it is only loaded with a container, the chassis 532*c* of the transfer trolley is made particularly long in the longitudinal direction of the crane bridge 516.

The transfer of the unloading container 522E from the water trolley 528 and the transfer of the loading container 522B to the water trolley 528 are carried out in accordance with the procedure described above with reference to FIGS. 7*a* and 7*b*, but with the difference that, in order to change the positions of containers 522B and 522E, the turntable 556 is now rotated by half a rotation about the vertically proceeding axis of rotation S.

The structure and function of a second embodiment of a container loading/unloading crane will be described below with reference to FIGS. 10*a* through 10*e*, with analogous parts being designated by the same reference numbers as in FIGS. 1 through 3, but with the addition of 600 to each number.

Since the cargo holds of container ships 618 are usually provided with partitions 660 to increase the stability of adjacent container stacks 620, the above statements apply to the loading and unloading of the containers located on deck. For the loading and unloading of containers located between the partitions 660, it is necessary, before the transfer travel after setting down of the loading container, to first raise the empty spreader above the upper edge of the partition 660 and then to lower it again on to the next unloading container. This takes time. A further reduction of the crane cycle can be achieved by the use of the embodiment shown in FIGS. 10*a* through 10*e*. The container loading/unloading crane 610 differs from the container loading/unloading crane 10 according to FIG. 1 by the fact that the water trolley 628 is designed with two lifting systems 628*b*1 and 628*b*2 with associated spreaders 628*c*1 and 628*c*2.

Figure 10A:
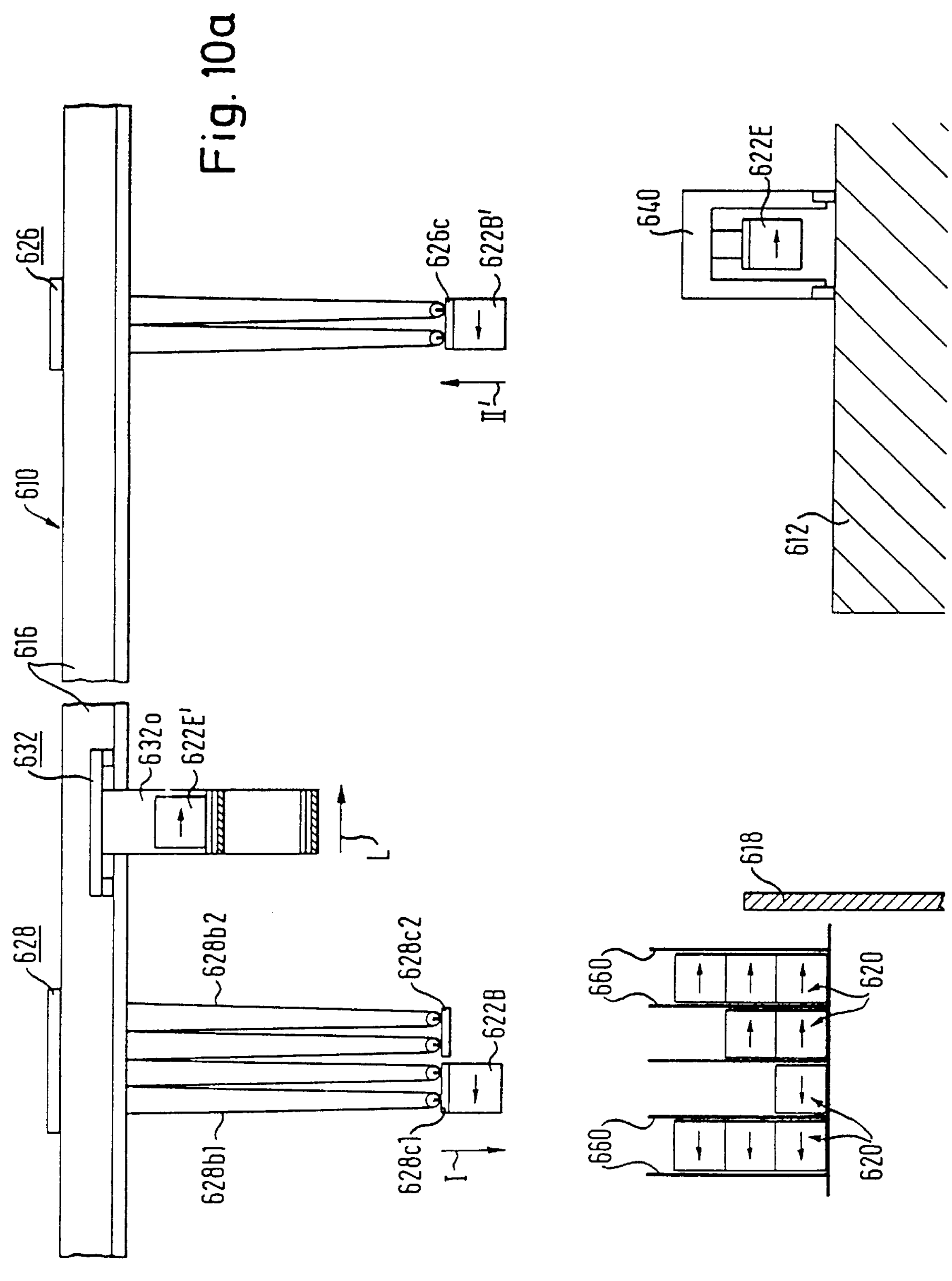
FIGS. 10*a* through 10*e* show schematic side views for the explanation of the double-cycle operation in a second embodiment of the container loading/unloading crane.

In the following, we shall start from a situation as shown in FIG. 10*a*. The water trolley 628 has just taken over from the transfer trolley 632*a* loading container 622B with the spreader 628*c*1 and is in the process of lowering both lifting systems 628*b*1 and 628*b*2, which is indicated in FIG. 10*a* by an arrow I. Also, the transfer trolley 632 has taken over from the water trolley 628 an unloading container 622E' into the upper receiving region 632*o* and is engaged in land travel (arrow L in FIG. 10*a*). The land trolley 626 has received a loading container 622B' and is lifting this (arrow II' in FIG. 10*a*). Also, an unloading container 622E previously set down by the land trolley 626 is carried away by a transport unit 640.

Figure 10B:
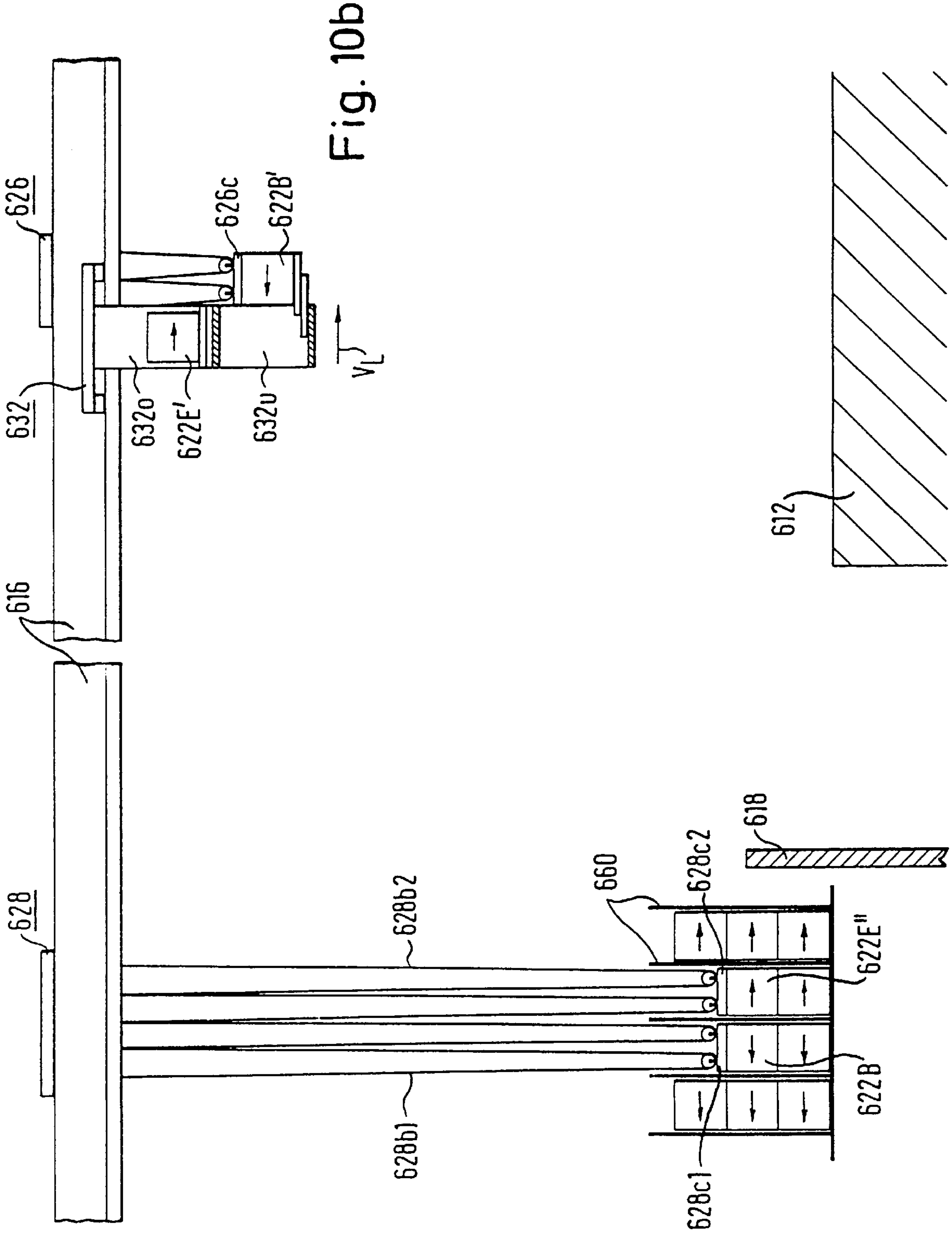
Figure 10C:
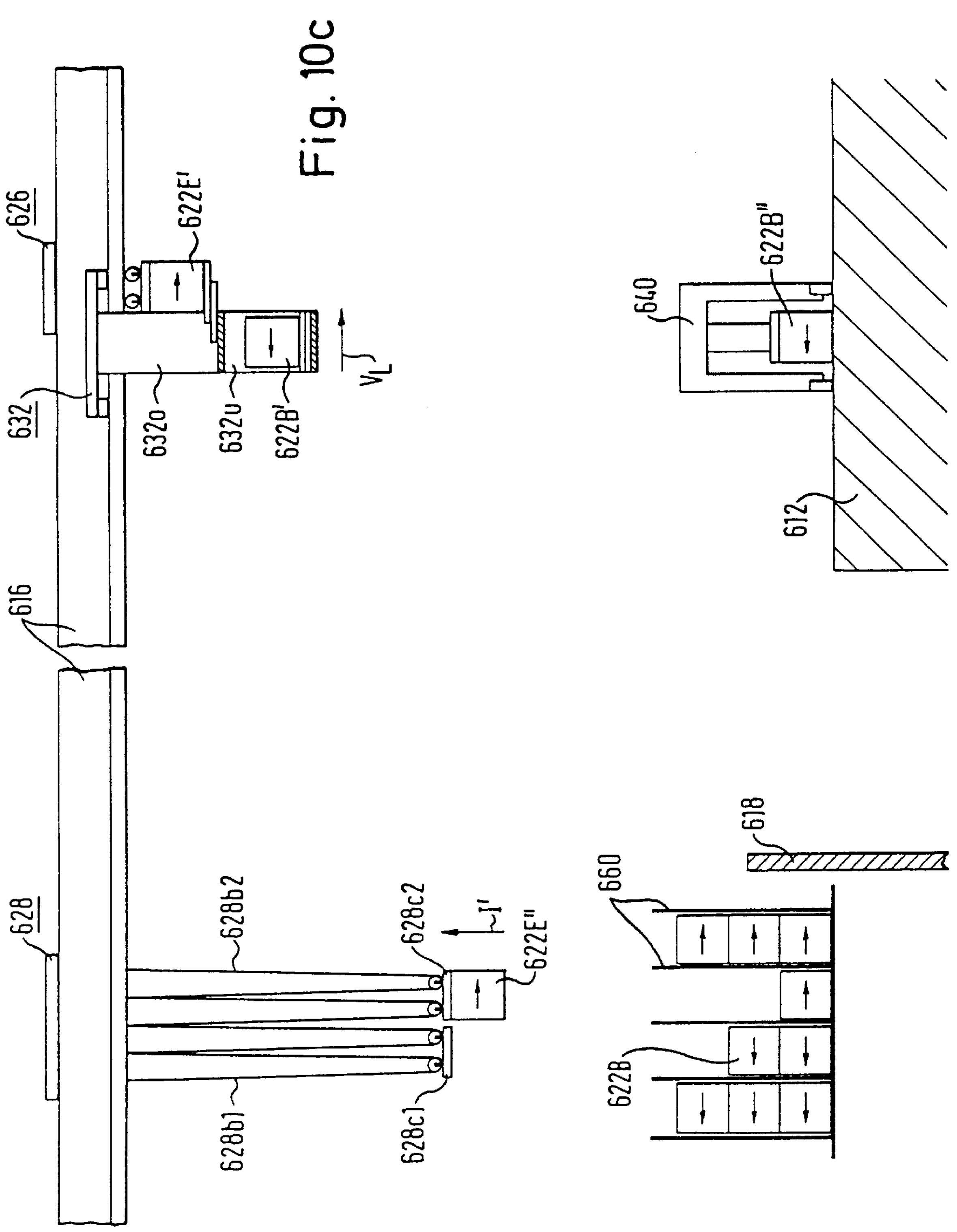

The exchange of the containers 622E' and 622B' between the land trolley 626 and the transfer trolley 632 shown in FIGS. 10*b* and 10*c* proceeds in the same manner as was explained above for the container loading/unloading crane 10 with reference to FIGS. 9*b* and 9*c*, to which description specific reference is hereby made.

In the meantime, the water trolley 628 has unloaded the loading container 622B on the container ship 618, separated the spreader 628*c*1 and coupled the spreader 628*c*2 to the next unloading container 622E".

Figure 10D:
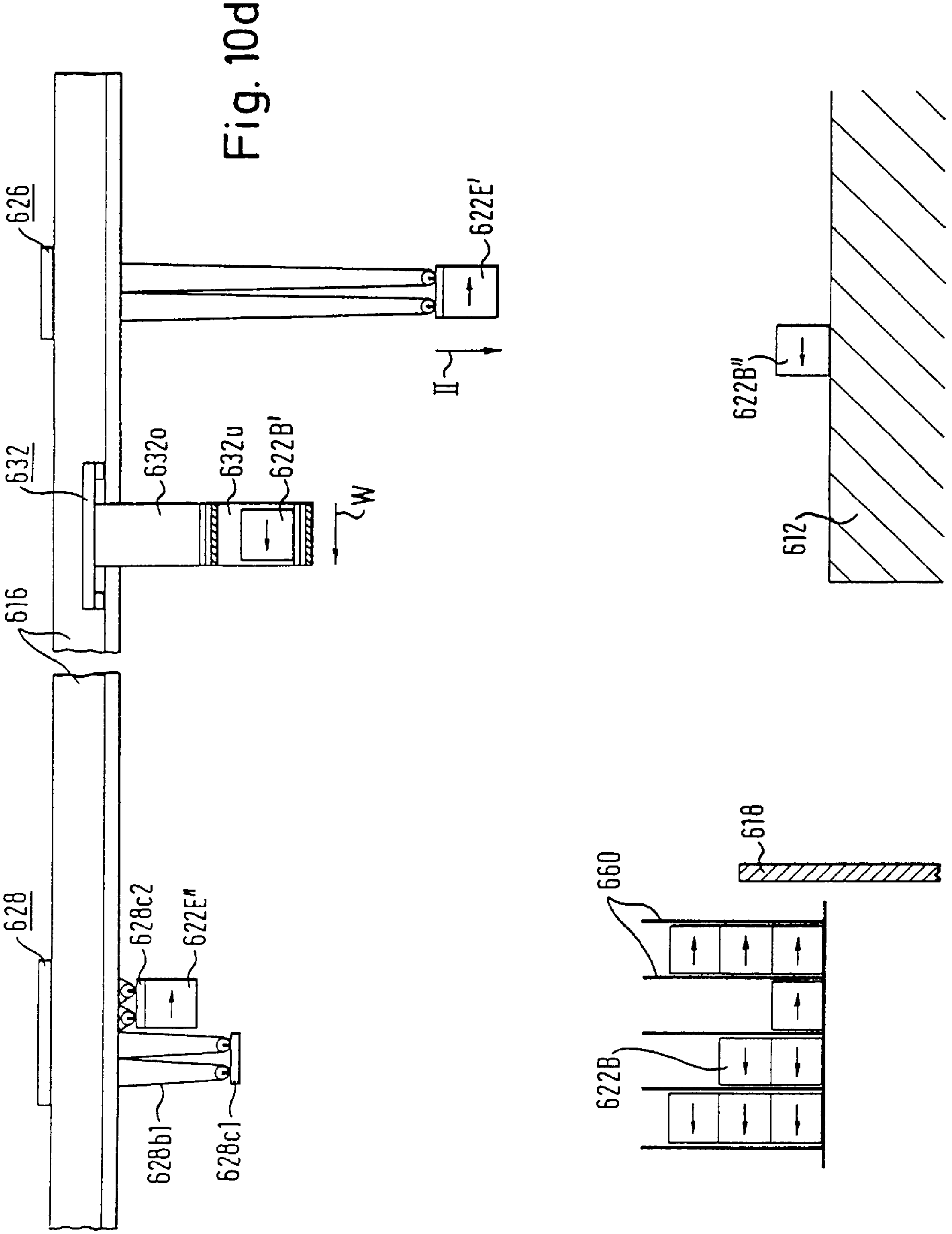

According to FIG. 10*c*, the water trolley 628 lifts the spreaders 628*c*1 and 628*c*2 and thus lifts the unloading container 622W" (arrow I'). In this process, the spreader 628*c*2 with the unloading container 622E" is lifted as far as possible, whereas the spreader 628*c*1 is lifted only to the level of the lower receiving region 632*u*, as shown in FIG. 10*d*. Also, according to FIG. 10*d*, the transfer trolley 632 with the loading container 622B' is engaged in water travel (arrow W), and the land trolley 626 lowers the unloading container 622E' (arrow II).

Figure 10E:
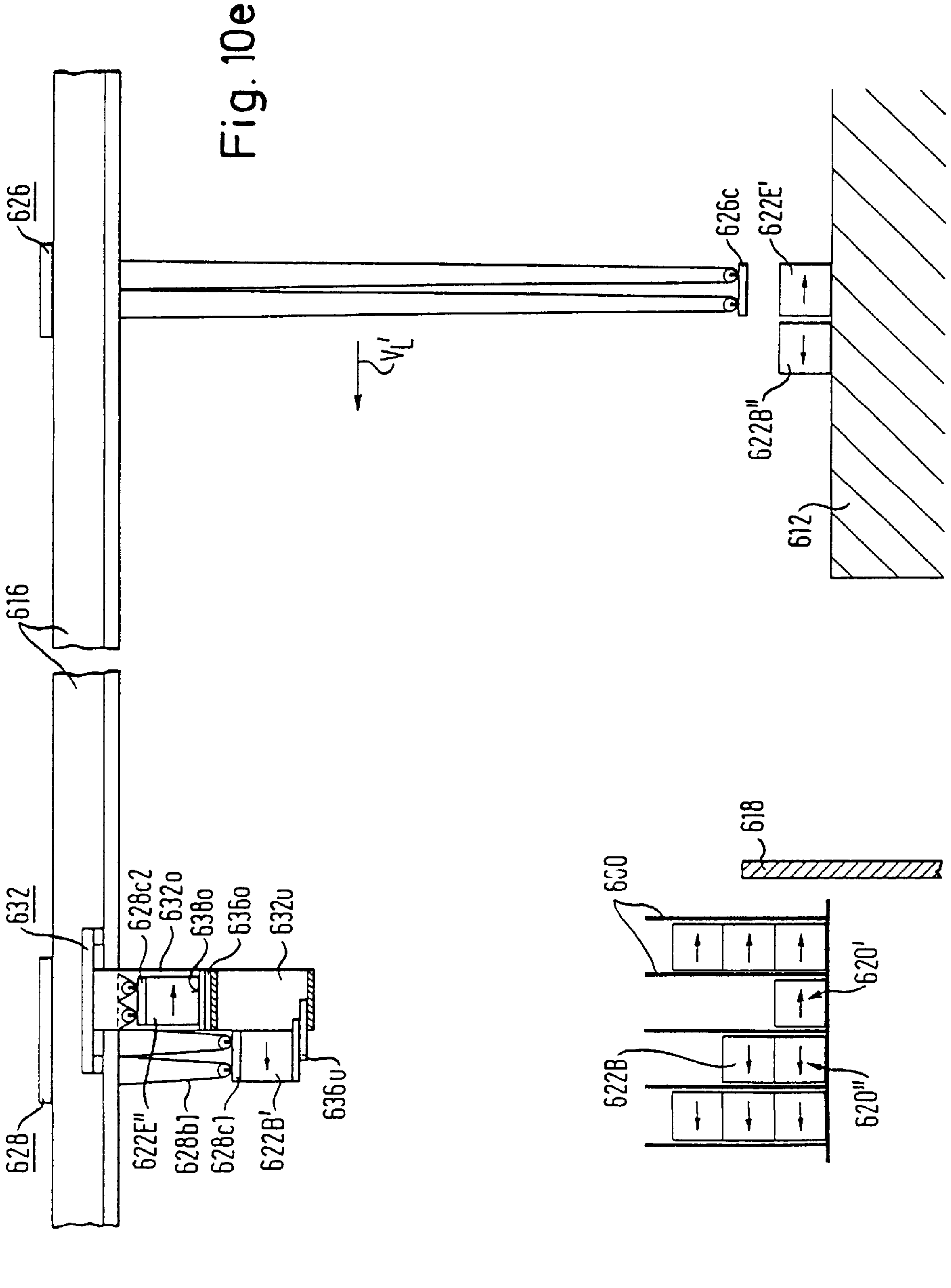

According to FIG. 10*e*, the transfer trolley 632 is moved up to the water trolley 628 in such a way that the unloading container 622E" at the spreader 628*c*2 is already located in the upper receiving region 632*o*. The unloading container 622E" can thus be simply transferred to the upper receiving region 632*o* of the transfer trolley 632 by setting it down on the set-down area 638*o* and separating the spreader 628*c*2, i.e., without moving the operating device 636*o* out into the water-side operating position. Simultaneously with the setting down of the unloading container 622E", the loading container 622B' is brought by means of the operating device 636*u* into the water-side operating position, in which it is then taken over by the water trolley 628 by coupling of the spreader **628*c*1. As a result, the loading container 622B' is already directly above the container stack 620", on which the loading container 622B had last been set down, so that the water trolley 628 normally does not have to carry out any displacement travel in the case of the container loading/unloading crane 610**.

The land trolley 626 has, in the meantime, set down the unloading container 622E' and is engaged in a water-directed displacement travel (arrow $V_L$' in FIG. **10*e*) of one stack width, in order to receive the next loading container 622**B".

The double-cycle loading and unloading process described above is repeated until the container ship 618 has been completely unloaded and simultaneously loaded. The water trolley 628 must always carry out a displacement travel of one stack width whenever an unloading-container stack 620 on the container ship 618 has been completely removed (in FIG. **10*e*, the next stack will be 620**').

Figure 11:
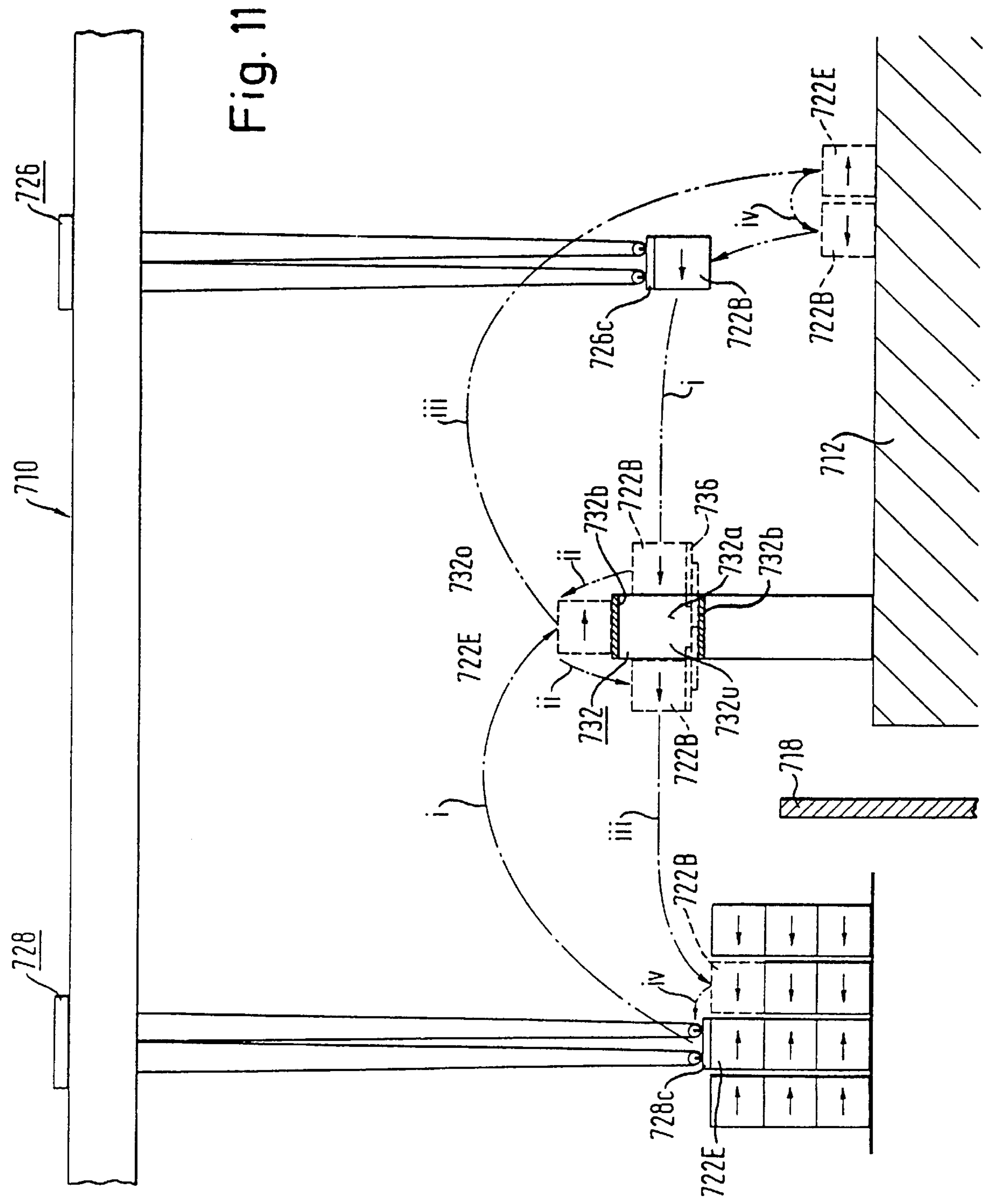
FIG. 11 shows a schematic side view for the explanation of the double-cycle operation in a further embodiment of the container loading/unloading crane.
Figure 12A:
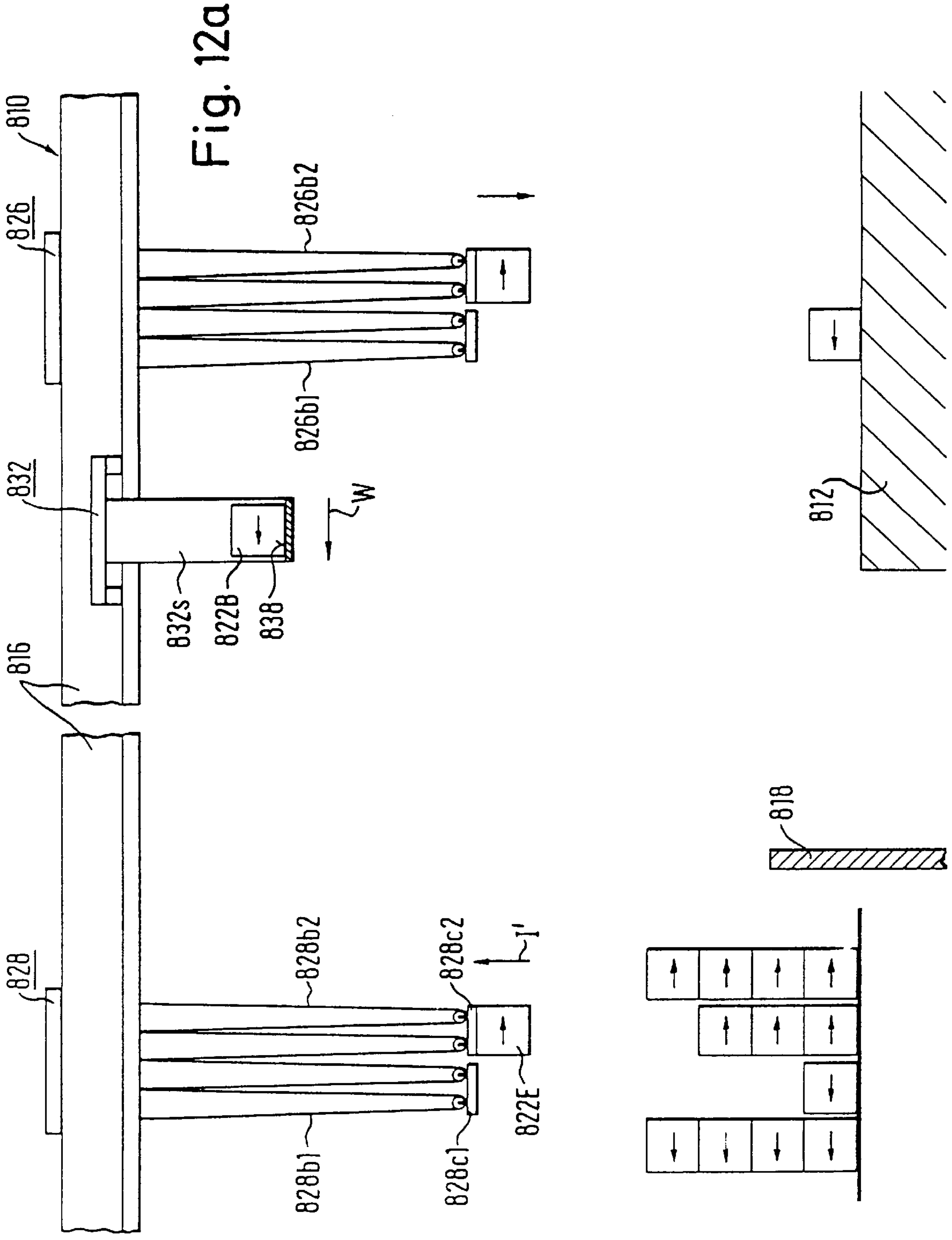
FIGS. 12*a* through 12*d* show schematic side views for the explanation of the double-cycle operation in a further embodiment of the container loading/unloading crane.
Figure 12B:
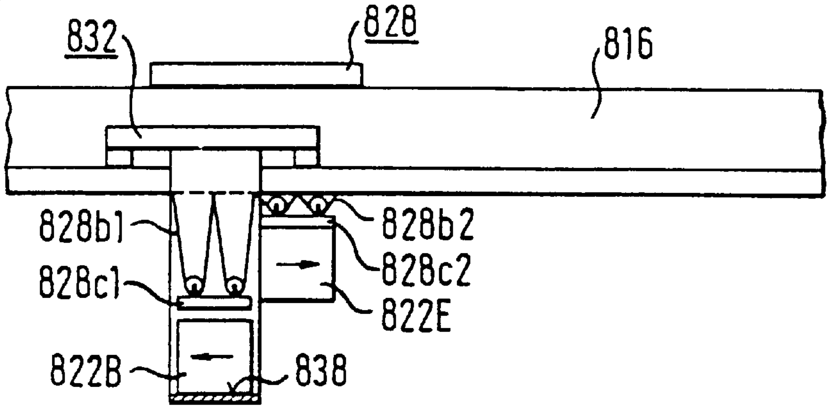
Figure 12C:
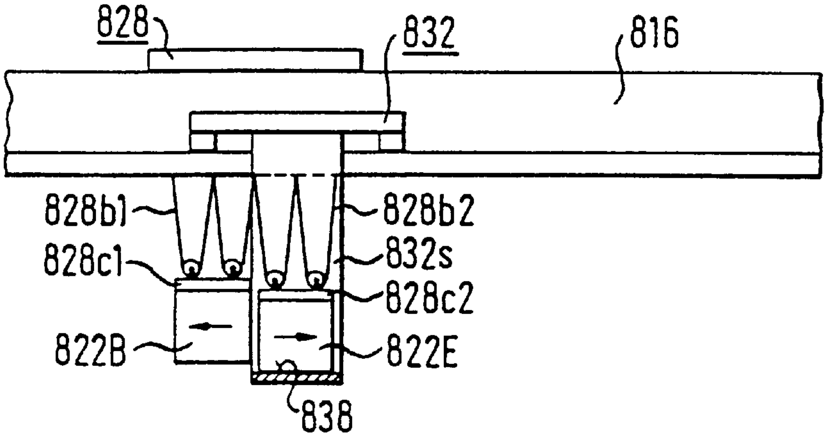
Figure 12D:
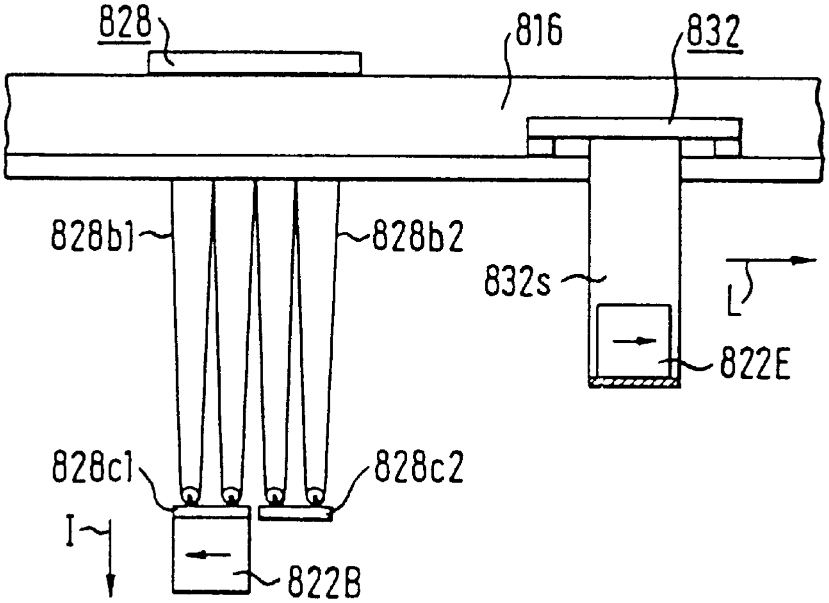

The structure and function of a third embodiment of a container loading/unloading crane will be described below, with reference to FIG. 11, with analogous parts being designated by the same reference numbers as in FIGS. 1 through 3, but with the addition of 700 to each number.

The container loading/unloading crane 710 differs from the container loading/unloading crane 10 according to FIG. 1 by the fact that, instead of the transfer trolley 32 movable along the crane bridge 16, a transfer unit 732 fixed to the quay 712 is provided under the crane 710, and the land trolley 726 and water trolley 728, in addition to the lifting movements, also take over the horizontal transfer of the containers.

The transfer unit 732 contains a lower receiving region **732*u*, which is enclosed by two vertical side parts 732*a* and two horizontal connecting bases 732*b* and is equipped with an operating device 736. The operating device 736 can have any of the structures described above. The upper receiving region 732*o* has only a base in the form of the upper connecting base 732*b*. The water trolley 728 and land trolley 726 have the same structure as the water trolley 28 and the land trolley 26 of the container loading/unloading crane according to FIG. 1. The loading and unloading of containers in a double-cycle operation will be described briefly below for the container loading/unloading crane 710. In a first step, the water trolley 728 takes up an unloading container 722E and transports it to the transfer unit 732, where it sets it down in the upper receiving region 732*o*, i.e., on the upper connecting base 732*b* (dash-dotted line (i)). In the meantime, the land trolley 726 has taken up a loading container 722B from the quay 712 and has set it down on the operating device 736 of the lower receiving region 732*u***, which has already moved out into the land-side operating position (dash-dot-dot line (i)).

In a subsequent second step, the loading container 722B is transferred by the operating device 736 from the land-side operating position to the water-side operating position. The spreader **728*c* of the water trolley 728 is moved from the upper receiving region 732*o* to the lower receiving region 732*u*, where it takes up the loading container 722B (dash-dot line (ii)), and the spreader 726*c* of the land trolley 726 is moved from the lower receiving region 732*u* to the upper receiving region 732*o*, where it takes up the unloading container 722**E (dash-dot-dot line (ii)).

In a third step, the water trolley 728 transports the loading container 722B to the container ship 718 and sets it down there (dash-dot line (iii)). At the same time, the land trolley 726 transports the unloading container 722E to the quay 712 and sets it down there (dash-dot-dot line (iii)).

In a fourth and final step of the operating cycle, the water trolley 728 and land trolley 726 each carry out a displacement travel of approximately one stack width, in order to receive the next container from the ship 718 or quay 712, respectively (dash-dot line (iv) and dash-dot-dot line (iv), respectively).

The structure and operation of a third embodiment of a container loading/unloading crane by means of which a loading and unloading of a container ship in a double-cycle operation is also possible will be described below with reference to FIGS. **12*a* through 12*d*. In FIGS. 12*a* through 12*d*, analogous parts are designated by the same reference numbers as in FIGS. 1 through 3**, but with the addition of 800 to each number.

The container loading/unloading crane 810 differs from the container loading/unloading crane 10 according to FIG. 1 by the fact that both the water trolley 828 and the land trolley 826 are equipped with two lifting systems **828*b*1 and 828*b*2 and 826*b*1 and 826*b*2, respectively, and also that the transfer trolley 832 contains only one receiving region 832*s*. The distance of the container set-down area 838 of the receiving region 832*s* from the crane bridge 816 is dimensioned such that the transfer trolley 832 loaded with a container can move through below a lifting system carrying a container, as is shown, in particular, in FIG. 12*b***.

The takeover of a loading container **822*b* from the transfer trolley 832 and the transfer of an unloading container 822E to the transfer trolley 832 will be described briefly below, for the example of the water trolley 828**.

According to FIG. **12*a*, the transfer trolley 832 has just taken over the loading container 822B from the land trolley 826 and is engaged in water travel to the water trolley 828 (arrow W). The water trolley 828 has taken up the unloading container 822E from the container ship 818 with its spreader 828*c*2** and is lifting this container (arrow I').

According to FIG. **12*b*, the water trolley 828 has lifted the unloading container 822E as far as possible, so that the transfer trolley 832, loaded with the loading container 822B, was able to travel under the lifting system 828*b*2 to a position under the lifting system 828*b*1. The spreader 828*c*1 is lowered in order to take over the loading container 822**B from the transfer trolley.

After this has taken place, the now empty transfer trolley 832 is moved according to FIG. **12*c* under the lifting system 828*b*2 so that the unloading container 822E can be set down in the receiving region 832*s*. The transfer trolley 832 then enters into land travel with the unloading container 822E according to FIG. 12*d* (arrow L), and the water trolley 828 lowers the loading container 822**B down to the container ship (arrow I).

The transfer and takeover of the loading container 822B and unloading container 822E between the transfer trolley 832 and land trolley 826 proceeds in a corresponding manner and will therefore not be described in detail.

With all of the embodiments of the freight loading/unloading crane according to the invention described above and explained for the example of a container loading/unloading crane, freight carriers, e.g., container ships, can be loaded and unloaded in a time-saving double-cycle operation. Because, in this case, according to the invention, the cycle advantages of a crane equipped with several trolleys can be used at the same time, this results in an overall greatly increased loading and unloading speed which, in the examples described above, is reflected in shorter turn-around times of the ships, with a corresponding cost saving for the shipping companies.

The structure and operation of a fourth embodiment of a container loading/unloading crane will be described below with reference to FIGS. 13*a* through 13*d*. In FIGS. 13*a* through 13*d*, analogous parts are designated by the same reference numbers as in FIGS. 1 through 3, but with the addition of 900 to the numbers.

The container loading/unloading crane 910 differs from the container loading/unloading crane 10 according to FIG. 1 by the fact that the transfer trolley 932 contains only one receiving region 932*s*. This receiving region 932*s* is equipped with an operating device 936*s*. Although the container loading/unloading crane 910 is usually used in a single-cycle operation, i.e., the container ship 918 is either loaded or unloaded, equipping the receiving region 932*s* with the operating device 936*s* produces distinct time advantages in comparison with a conventional container loading/unloading crane, whose single receiving region is not provided with an operating device. This will be explained in greater detail below for the example of the unloading of the container ship 918 in a single-cycle operation.

Figure 13A:
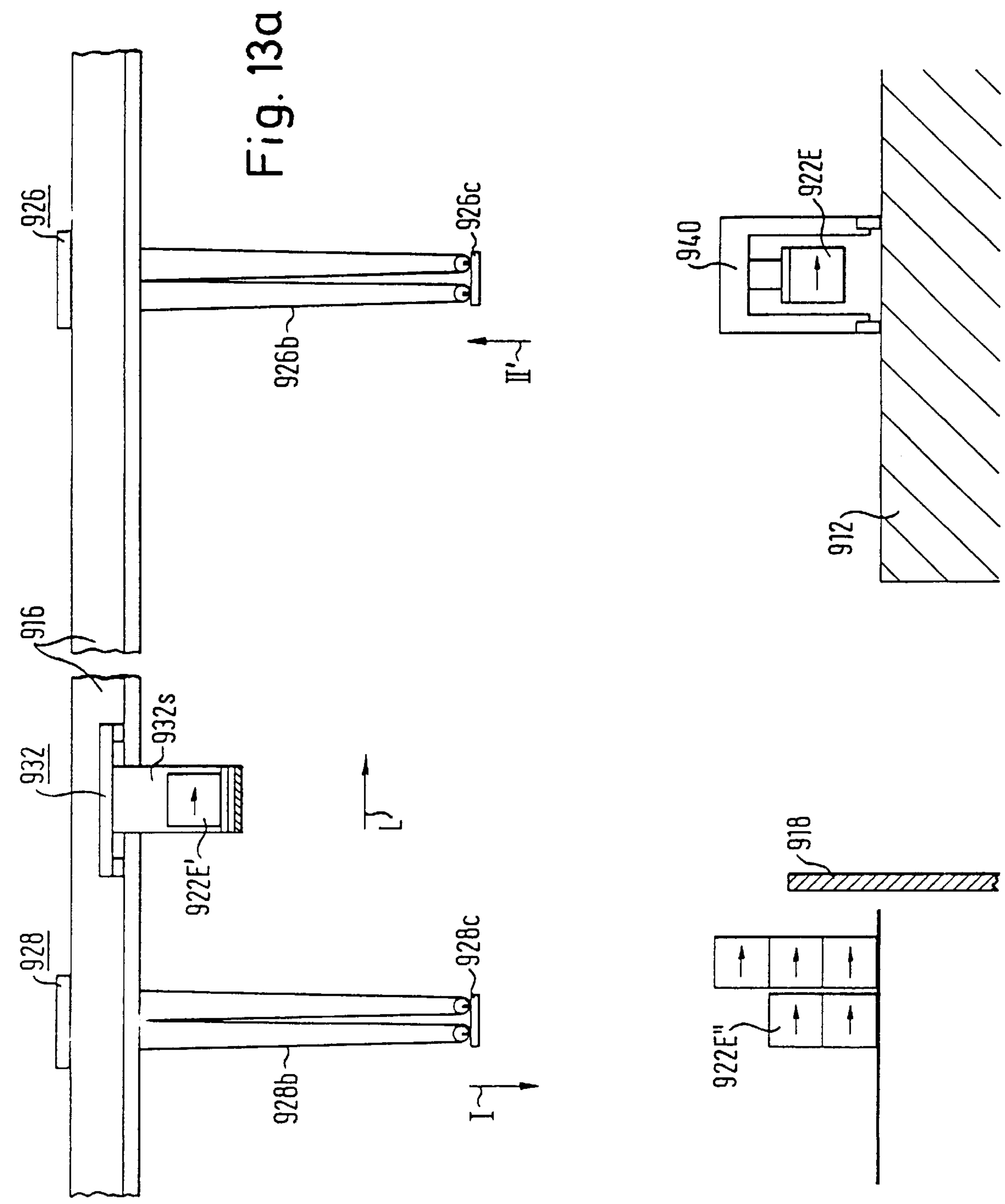
FIGS. 13*a* through 13*d* show schematic side views for the explanation of the unloading operation in a further embodiment of the container loading/unloading crane.

We start here from a situation as shown in FIG. 13*a*. The water trolley 928 has just transferred an unloading container 922E' to the transfer trolley 932 and is lowering its spreader 928*c* without a container (arrow I) in order to receive the next unloading container 922". In the meantime, the transfer trolley 932, with the unloading container 922E', is engaged in land travel (arrow L). The land trolley 926 has set down the previous unloading container 922E on the quay 912 and is just in the process of lifting its spreader 926*c* without a container (arrow II'). In the meantime, the unloading container 922E is transported away from the quay 912 by a land-supported transport unit 940.

When the transfer trolley 932 has reached the land trolley 926, it is bolted to it. When the spreader 926*c* of the land trolley 926 is finally in its highest position, the transfer trolley 932 of the land trolley 926 services the unloading container 922E'. According to FIG. 13*b*, it does this by moving the operating device 936*s* out on the land side. After this, the spreader 926*c* is lowered and is coupled to the unloading container 922E'.

Figure 13B:
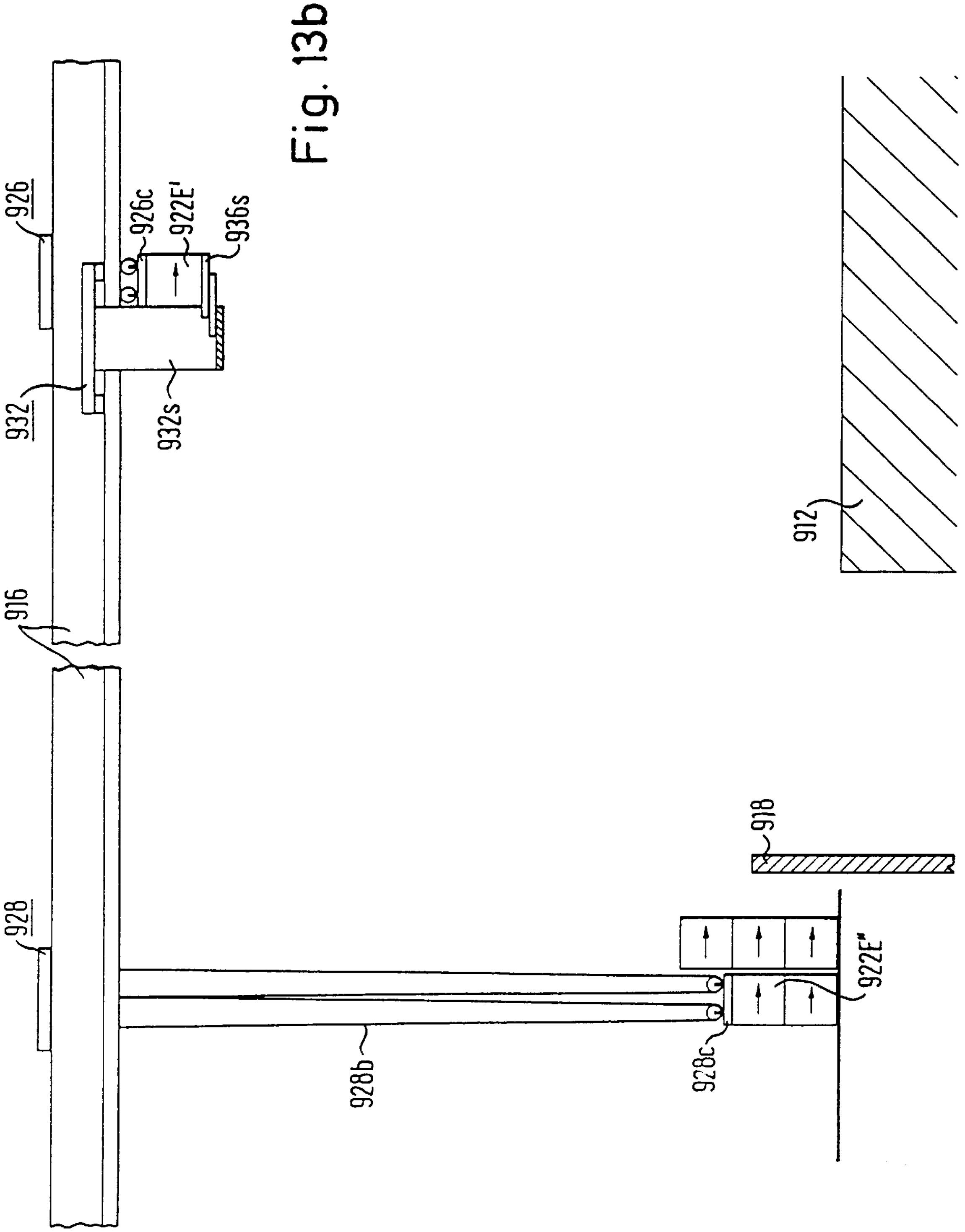
Figure 13C:
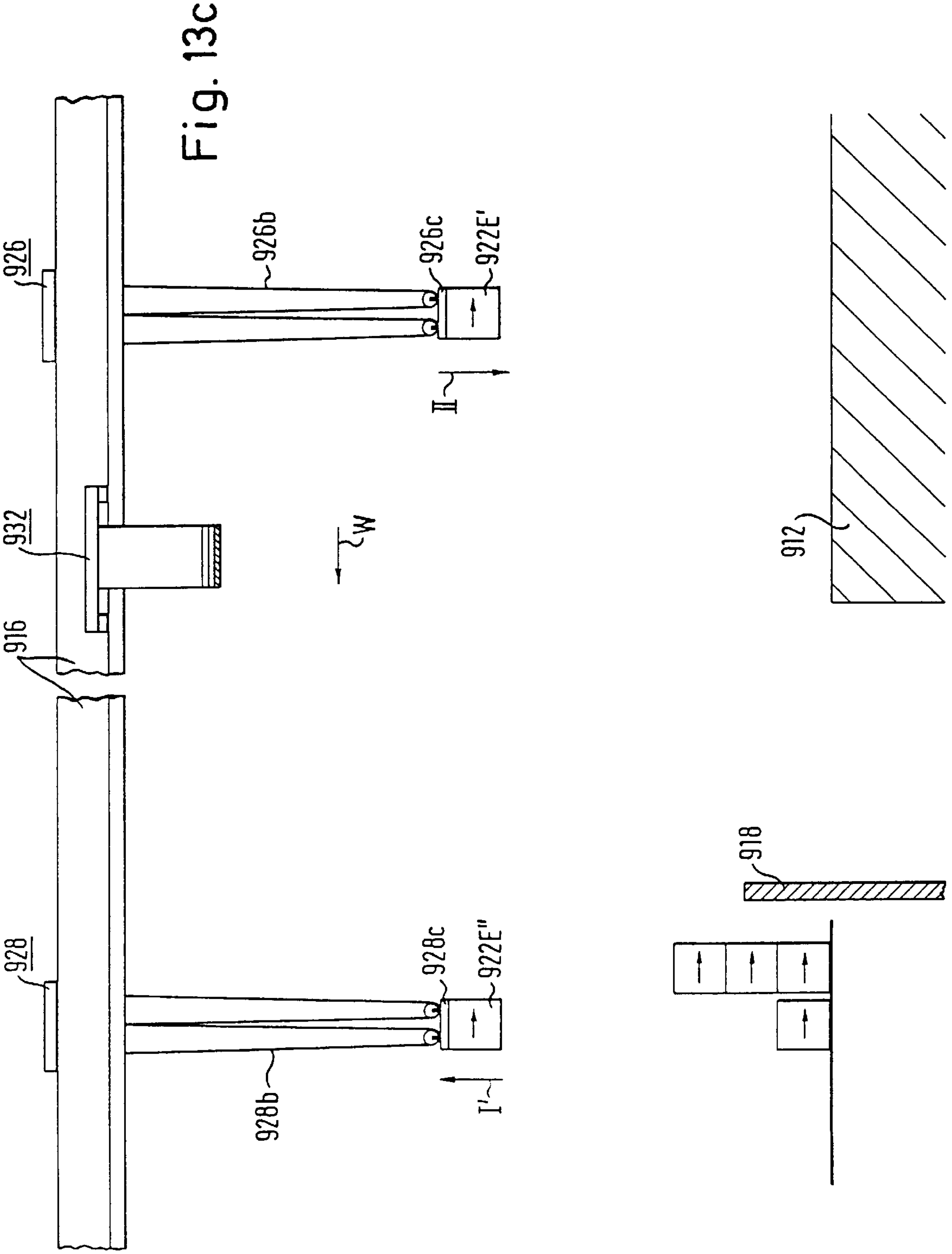

According to FIG. 13*b*, the water trolley 928 has coupled its spreader 928*c* to the next unloading container 922E" and, according to FIG. 13*c*, is lifting it in an upward direction by means of its lifting system 926*b* (arrow I').

The land trolley 926 has lifted the unloading container 922E' from the operating device 936*s*, so that it was possible to draw the latter into the transfer trolley 932. The land trolley 926, according to FIG. 13*c*, now lowers the unloading container 922E' by means of its lifting system 926*b* (arrow II). In the meantime, the transfer trolley 932, without a container, is engaged in water travel (arrow W).

In a conventional transfer trolley without an operating device, the last steps described above proceed as follows: the transfer trolley usually reaches the land trolley before the latter has completely lifted its spreader. The transfer trolley must therefore brake and wait until the spreader has been completely lifted. The transfer trolley then moves under the land trolley, so that the latter can receive the unloading container. However, in order for the land trolley to be able to lower the unloading container to the quay after this, the transfer trolley must first have vacated the space below the land trolley.

For the movement of the transfer trolley under the land trolley, the large mass of the transfer trolley including the mass of the unloading container must be accelerated and then braked, and the mass of the transfer trolley must also be first accelerated in order to vacate the space under the land trolley. The acceleration of this large mass requires a large amount of time and also the expenditure of a large amount of energy.

In the container loading/unloading crane 910 according to the invention, the servicing of the unloading container 922E' requires only the moving-out of the operating device 936*s*, and the vacating of the space under the land trolley 926 merely requires that the operating device be drawn in again. Consequently, it is not necessary to accelerate the total mass of the transfer trolley, but only the far smaller mass of the operating device. This requires less time and also saves energy.

Figure 13D:
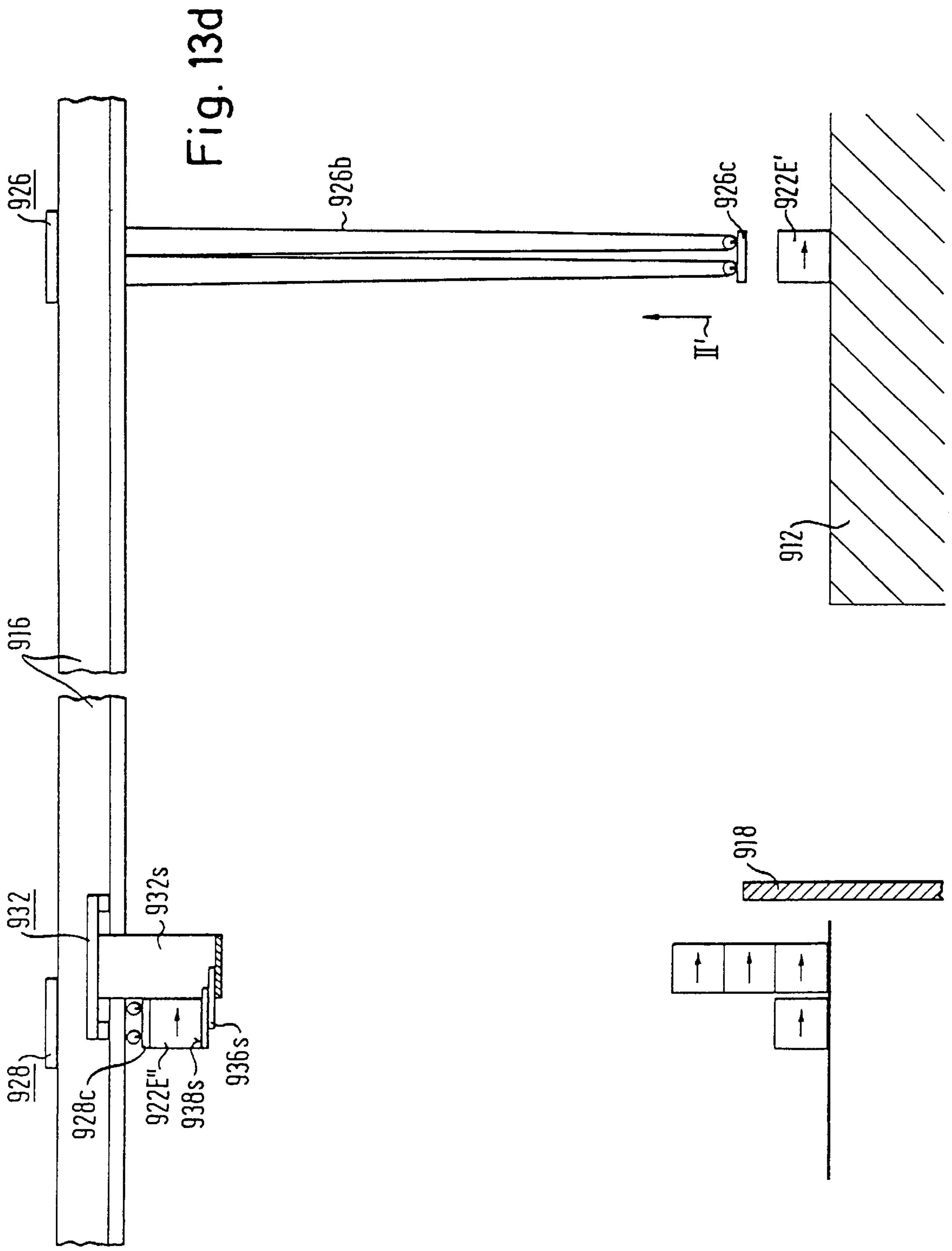

When the transfer trolley 932 has reached the water trolley 928 according to FIG. 13*d*, it is bolted to it. If the spreader 928c of the water trolley 928 together with the unloading container 922E" is in its highest position, then the operating device 936*s* moves out on the water side. The spreader 928*c* then sets down the unloading container 922E" on the container set-down area 938*s* and is uncoupled from it.

In the meantime, the land trolley 926 shortly before has set down the unloading container 922E' on the quay and is starting to lift its spreader 926*c* in the direction of the arrow II'.

In the case of the water-side container transfer as well, the container loading/unloading crane saves both time and energy, as compared with the conventional container loading/unloading crane.

In addition, the equipping of the transfer trolley with an operating device also shows control-engineering advantages, because the control of the movements of the transfer trolley and of the lifting systems of the land trolley and water trolley are separated, i.e., they can be carried out independently of each other. As described above, in the conventional container loading/unloading crane, the transfer trolley must brake ahead of the particular lifting trolley, wait for the complete lifting of the spreader, and finally continue moving to exactly below the lifting trolley, i.e., the movement of the transfer trolley must be coordinated with the movement of the lifting system of the lifting trolley. According to the invention, the transfer trolley moves directly into its final position next to the lifting trolley. When the lifting system has reached its final position, i.e., its highest position, then, in response to a an appropriate signal, the operating device is moved out.

The reaching of the final positions in each case can be indicated by the actuation of switches located on the lifting trolley by the transfer trolley or the lifting systems. The operating device is preferably designed in such a way that, in its maximally moved-out state, it shows the required relative positioning with respect to the lifting system of the lifting trolley.

For the loading of the container ship 918, the steps described above are carried out analogously, in reverse sequence.

The advantage in time, energy, and control described above can also be achieved in a transfer trolley with two load receiving regions arranged one above the other, if both load receiving regions are equipped with an operating device, as is the case, for example, for the transfer trolley 32 according to FIG. 3*a*.

It must also be emphasized that the use of the freight loading/unloading crane according to the invention is not restricted to the loading and unloading of container ships. Rather, it can be used with advantage wherever large quantities of cargo are to be transferred within the shortest possible time.

We claim:

1. A freight loading/unloading crane comprising:

a crane bridge with two longitudinal ends arranged at a distance from each other in a transfer direction, a front lifting unit movable on the crane bridge in the transfer direction associated with one of the longitudinal ends, a back lifting unit movable on the crane bridge in the transfer direction associated with the other of the longitudinal ends, each lifting unit having two independently operable lifting systems, each lifting system with an associated cable-suspended load receiving means, and a transfer unit having at least one load receiving region, each of the lifting systems and the transfer unit being arranged for the transfer of loads from the respective lifting unit to the load receiving region and for the reception of loads by the respective lifting system from the load receiving region, such transfers between each lifting system and the load receiving region being possible regardless of whether or not any other lifting system has taken up a load.

2. A freight loading/unloading crane according to claim 1, wherein the transfer unit is displaceable in the transfer direction.

3. A freight loading/unloading crane according to claim 2, wherein the transfer unit is displaceable on a transport track extending between the longitudinal ends of the crane bridge in the transfer direction.

4. A freight loading/unloading crane according to claim 1, wherein the transfer unit is adapted to be fixed against displacement in the transfer direction.

5. A freight loading/unloading crane according to claim 4, wherein the transfer unit is fixed to the crane bridge.

6. A freight loading/unloading crane according to claim 4, wherein the transfer unit is adapted to be positioned on a foundation carrying the freight loading/unloading crane so as to be moveable in a direction extending essentially orthogonally to the transfer direction.

7. A freight loading/unloading crane according to claim 4, wherein the transfer unit is adapted to be fixed on a foundation carrying the freight loading/unloading crane.

8. A freight loading/unloading crane comprising:

a crane bridge with two longitudinal ends arranged at a distance from each other in a transfer direction, a front lifting unit movable on the crane bridge in the transfer direction associated with one of the longitudinal ends, a back lifting unit movable on the crane bridge in the transfer direction associated with the other of the longitudinal ends, each lifting unit having at least one lifting system with associated cable-suspended load receiving means, and a transfer unit movable on the crane bridge in the transfer direction and having a load receiving region with a load receiving area, the transfer unit and each lifting unit being arranged such that loads can be exchanged between each lifting unit and the transfer unit, the load receiving region of the transfer unit being constructed with an operating device by means of which the load receiving area is transferable for load exchange with the front lifting unit in a forward direction between a transfer position and a front operating position and is transferable for load exchange with the back lifting unit in a backward direction between the transfer position and a back operating position, the operating device being arranged such that when a load exchange between the transfer unit and a respective one of the lifting units has been accomplished with the load receiving area in the respective operating position and the load receiving area has then been transferred to the transfer position, the load receiving means of said respective lifting unit can be lowered in a substantially vertical direction without any movement of either the transfer unit or said respective lifting unit.

9. A freight loading/unloading crane according to claim 8, wherein the transfer unit comprises at least two load receiving regions, each having a load receiving area, each of the load receiving regions being arranged such that it can receive loads from each lifting unit and transfer loads to each lifting unit independently of any of the other load receiving regions.

10. A freight loading/unloading crane according to claim 9, wherein there are two load receiving regions arranged one above the other, and at least the lower load receiving region has an operating device.

11. A freight loading/unloading crane according to claim 9, wherein each of the load receiving regions is constructed with an operating device by means of which the load receiving area is transferable for load exchange with the front lifting unit in a forward direction between a transfer position and a front operating position and is transferable for load exchange with the back lifting unit in a backward direction between a transfer position and a back operating position, each operating device being arranged such that when a load exchange between the transfer unit and a respective one of the lifting units has been completed, and the load receiving area allocated to the respective operating device has been transferred again to the transfer position, the load receiving means of said respective lifting unit is lowerable in a substantially vertical direction without any prior relative movement of the transfer unit and said respective lifting unit.

12. A freight loading/unloading crane according to claim 8 or claim 11, wherein at least said one operating device includes at least one extendable element with a base part fastened to the transfer unit and at least one telescope part that can be adjusted telescopically in the forward direction and backward direction relative to the base part.

13. A freight loading/unloading crane according to claim 12, wherein the load receiving area is formed by a surface of the telescope part facing away from the base part.

14. A freight loading/unloading crane according to claim 8 or claim 11, wherein at least said one operating device includes a platform that can be moved out on rails projecting in the forward direction and backward direction from the receiving region.

15. A freight loading/unloading crane according to claim 14, wherein the platform is formed by a fixed plate that can be moved out by means of rollers attached to it on the rails, with the load receiving area being formed by an upper, horizontally proceeding surface of the fixed plate.

16. A freight loading/unloading crane according to claim 14, wherein the platform is formed by an endless belt drawn around a guide body which, by means of roller elements, can be moved out on the rails, with the load receiving area being formed by an upper, horizontally proceeding part of the endless belt.

17. A freight loading/unloading crane according to claim 11, wherein there are two load receiving areas, each of which is fixed relative to the associated load receiving region, and are jointly swingable relative to the transfer unit about a substantially horizontal axis, during which they maintain their orientation relative to the transfer unit.

18. A freight loading/unloading crane according to claim 11, wherein the load receiving areas are arranged in a fixed manner on a substantially horizontal turntable, which is rotatable about a substantially vertical axis.

19. A process for the transport of loads between two horizontally separated load set-down regions with the use of a freight loading/unloading crane having a crane bridge extending between the load set-down regions in a transport direction, a load receiving and load transport system carried by the crane bridge and associated with each set-down region, and a transfer unit that is carried by and movable on the crane bridge in the transfer direction and has a load receiving region with a load receiving area, the load receiving region being constructed with an operating device by means of which the load receiving area is transferable between a back operating position, a transfer position, and a forward operating position, the operating device being arranged such that when a load exchange between the transfer unit and a respective one of the load receiving and load transfer systems has been accomplished with the load receiving area in the respective operating position and the load receiving area has then been transferred to the transfer position, the load receiving means of said respective load receiving and load transfer system can be lowered in a substantially vertical direction without any movement of either the transfer unit or said respective load receiving and load transfer system in which, for transporting loads from either set-down region to the other set-down region, the loads are:

picked up and lifted by the load receiving and load transport system associated with the set-down region from which loads are being transported, transferred from the load receiving and load transport system associated with the set-down region from which loads are being transported to the transfer unit with the load receiving area in the back operating position, moved in the transfer direction by the transfer unit with the load receiving area in the transport position, transferred from the transfer unit to the load receiving and load transport system associated with the set-down region to which loads are being transported with the load receiving area in the forward operating position, and lowered and released to the set-down area to which the loads are being transported by the load receiving and load transport system associated with the set-down region to which loads are being transported.

* * * * *